United States Patent
Zhu et al.

(10) Patent No.: US 12,430,797 B2
(45) Date of Patent: Sep. 30, 2025

(54) LOCALIZATION METHOD AND APPARATUS, ELECTRONIC DEVICE, AND STORAGE MEDIUM

(71) Applicant: BEIJING YOUZHUJU NETWORK TECHNOLOGY CO., LTD., Beijing (CN)

(72) Inventors: Minzhao Zhu, Beijing (CN); Tao Kong, Beijing (CN); Lei Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 123 days.

(21) Appl. No.: 18/566,500

(22) PCT Filed: May 27, 2022

(86) PCT No.: PCT/CN2022/095453
§ 371 (c)(1),
(2) Date: Dec. 1, 2023

(87) PCT Pub. No.: WO2022/253113
PCT Pub. Date: Dec. 8, 2022

(65) Prior Publication Data
US 2024/0249430 A1 Jul. 25, 2024

(30) Foreign Application Priority Data
Jun. 1, 2021 (CN) .......................... 202110609933.0

(51) Int. Cl.
*G06T 7/73* (2017.01)
*G01C 21/00* (2006.01)

(52) U.S. Cl.
CPC .............. *G06T 7/73* (2017.01); *G01C 21/005* (2013.01); *G06T 2207/10028* (2013.01)

(58) Field of Classification Search
CPC ... G06T 7/73; G06T 7/70; G06T 2207/10028; G06T 17/05; G06T 17/205; G01C 21/005; G06F 18/23
(Continued)

(56) References Cited

U.S. PATENT DOCUMENTS 11,238,643 B1 * 2/2022 Yang .......................... G06T 7/33
11,348,269 B1 * 5/2022 Ebrahimi Afrouzi ... G01S 17/48
(Continued)

FOREIGN PATENT DOCUMENTS

| CN | 107144285 A | 9/2017 |
|---|---|---|
| CN | 108759844 A | 11/2018 |

(Continued)

OTHER PUBLICATIONS

International Search Report, and Written Opinion, International Patent Application No. PCT/CN2022/095453, Aug. 25, 2022, with English translation (13 pages).

(Continued)

*Primary Examiner* — Andrew R Dyer
(74) *Attorney, Agent, or Firm* — Astute IP Law Group

(57) ABSTRACT

The present disclosure relates to a localization method and apparatus, an electronic device, and a storage medium. The localization method comprises: acquiring a target local semantic point cloud map, a global semantic grid map, and a laser point cloud map; performing pose identification on the basis of the target local semantic point cloud map and the global semantic grid map to obtain a set of candidate poses; and determining a target pose according to the laser point cloud map and the set of candidate poses.

18 Claims, 4 Drawing Sheets

(58) Field of Classification Search
USPC .......................................................... 701/446
See application file for complete search history.

(56) References Cited

U.S. PATENT DOCUMENTS

| | | |
|---|---|---|
| 2019/0206122 A1 | 7/2019 | Zhan et al. |
| 2020/0342614 A1* | 10/2020 | Yan ............................ G06T 7/33 |
| 2020/0402300 A1 | 12/2020 | Ding et al. |
| 2021/0334988 A1* | 10/2021 | Xiao ..................... G06F 18/2193 |
| 2021/0370968 A1* | 12/2021 | Xiao ...................... G01S 7/4808 |
| 2021/0374978 A1* | 12/2021 | Döring ....................... G06T 7/33 |
| 2022/0292290 A1* | 9/2022 | Yang ........................... G06T 7/73 |
| 2022/0292786 A1* | 9/2022 | Pelzl ...................... G06T 19/006 |
| 2022/0301192 A1* | 9/2022 | Boardman .............. G06T 7/579 |
| 2022/0406015 A1* | 12/2022 | Yang ........................ G06T 3/147 |
| 2023/0045796 A1* | 2/2023 | He ........................... B25J 9/163 |
| 2024/0005597 A1* | 1/2024 | Sucar ....................... G06T 17/00 |

FOREIGN PATENT DOCUMENTS

| | | |
|---|---|---|
| CN | 111596298 A | 8/2020 |
| CN | 112363158 A | 2/2021 |
| CN | 112836698 A | 5/2021 |
| CN | 113256712 A | 8/2021 |

OTHER PUBLICATIONS

Notification to Grant Patent Right for Invention, Chinese Patent Application No. 202110609933.0, Mar. 24, 2023, with English translation (4 pages).
Office Action issued in Chine Patent Application No. 202110609933.0, Jan. 5, 2023, with English translation (14 pages).

* cited by examiner

LOCALIZATION METHOD AND APPARATUS, ELECTRONIC DEVICE, AND STORAGE MEDIUM

CROSS-REFERENCE OF RELATED APPLICATION

This application is a national stage of International Application No. PCT/CN2022/095453, filed on May 27, 2022, which claims the priority of a Chinese patent application No. 202110609933.0 filed in China Patent Office on Jun. 1, 2021, both of the aforementioned applications are hereby incorporated by reference in their entireties.

FIELD OF THE INVENTION

The present disclosure relates to the field of localization technology and relates, for example, to a localization method, apparatus, electronic device, and storage medium.

BACKGROUND

To realize autonomous navigation of a robot, it is necessary to localize the robot, e.g., performing loop closure detection or relocalization on the robot.

Simultaneous Localization And Mapping (SLAM) technology based on two-dimensional (2 Dimension, 2D) LiDAR is generally used to localize an indoor robot, and a loop closure detection module is used to match a local laser point cloud at a current position with a laser point cloud in a historical map, to determine whether the current position of the robot is a position it has passed, and send the detected loop closure pose to a back-end.

DISCLOSURE OF THE INVENTION

The present disclosure may provide a localization method comprising:
  acquiring a target local semantic point cloud map at a current position, a global semantic grid map, and a laser point cloud map, each grid of the global semantic grid map recording a value of probability that a target semantic object exists in the grid;
  performing pose identification on the basis of the target local semantic point cloud map and the global semantic grid map to obtain a set of candidate poses; and
  determining a target pose according to the laser point cloud map and the set of candidate poses, the target pose comprising a loop closure pose and/or a relocalization pose.

The present disclosure may also provide a localization apparatus comprising:
  a map acquisition module configured to acquire a target local semantic point cloud map at a current position, a global semantic grid map, and a laser point cloud map, each grid of the global semantic grid map recording a value of probability that a target semantic object exists in the grid;
  a candidate pose identification module, configured to perform pose identification on the basis of the target local semantic point cloud map and the global semantic grid map to obtain a set of candidate poses;
  a target pose determination module configured to determine a target pose according to the laser point cloud map and the set of candidate poses, the target pose comprising a loop closure pose and/or a relocalization pose.

The present disclosure may also provide an electronic device comprising:
  one or more processors;
  a memory, configured to store one or more programs;
  wherein the one or more programs, when executed by the one or more processors, cause the one or more processors to implement the localization method as described above.

The present disclosure may also provide a computer-readable storage medium having stored thereon a computer program which, when executed by a processor, implements the localization method as described above.

DETAILED DESCRIPTION OF PREFERRED EMBODIMENTS

Embodiments of the present disclosure will be described below with reference to the accompanying drawings. Although some embodiments of the present disclosure are shown in the accompanying drawings, the present disclosure may be realized in a variety of forms, and these embodiments are provided for the purpose of understanding the present disclosure. The accompanying drawings and embodiments of the present disclosure are for exemplary purposes only.

The plurality of steps recited in the method embodiments of the present disclosure may be performed in a different order, and/or in parallel. Furthermore, the method embodiments may include additional steps and/or omit performing the illustrated steps. The scope of the present disclosure is not limited in this regard.

As used herein, the term "including" and its variations are open-ended, i.e. "including but not limited to". The term "based on" is "based at least in part on". The term "an embodiment" means "at least one embodiment"; the term "another embodiment" means "at least one additional embodiment"; the term "another embodiment" means "at least one other embodiment."; and the term "some embodiments" means "at least some embodiments". Relevant definitions of other terms will be given in the description below.

The concepts of "first" and "second" mentioned in this disclosure are only used to distinguish between different apparatuses, modules or units, and are not intended to limit the order or interdependence of the functions performed by these apparatuses, modules or units.

Modifiers "one" and "a plurality" mentioned in this disclosure are schematic and not limiting, and should be understood by those skilled in the art to mean "one or more than one" unless otherwise indicated in context.

The names of messages or information interacted between the plurality of apparatuses in embodiments of the present disclosure are used for illustrative purposes only and are not intended to place limitations on the scopes of those messages or information.

Currently, the 2D laser SLAM algorithm, which utilizes inter-laser point cloud matching for loop closure detection, is prone to mis-matching due to limited information provided by the laser point cloud, which in turn leads to a large error in map construction, resulting in a high false detection rate of loop closure detection and failing to meet localization requirements.

In view of this, the present disclosure may provide a localization method, apparatus, electronic device, and storage medium to reduce the false detection rate during localization.

Figure 1:
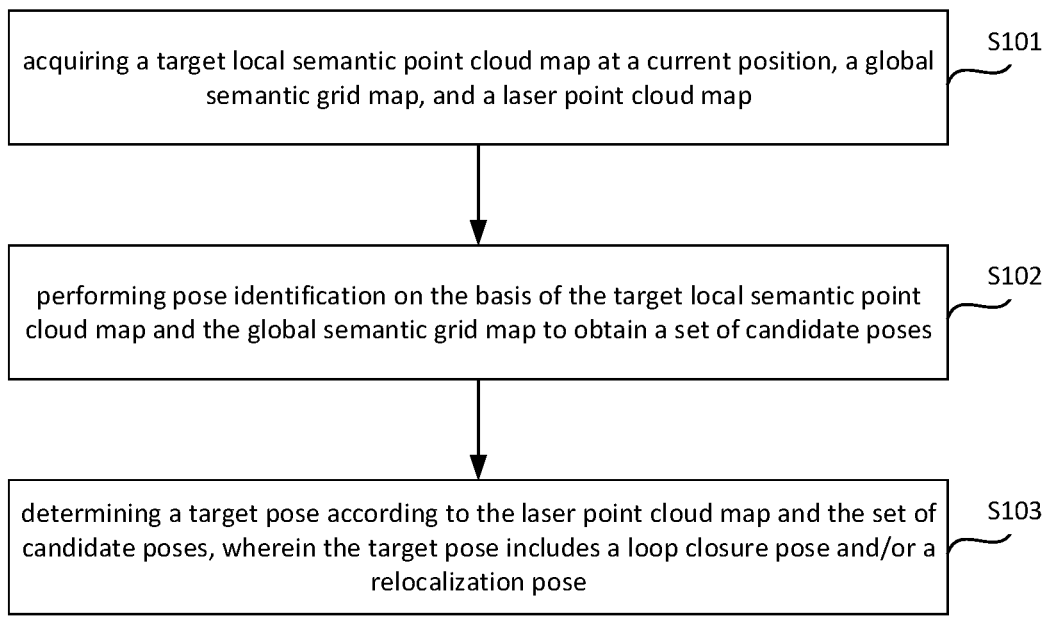
FIG. 1 shows a schematic flow chart of a localization method provided by embodiments of the present disclosure.

FIG. 1 shows a schematic flow chart of a localization method provided by embodiments of the present disclosure. The method may be performed by a localization apparatus, wherein the apparatus may be implemented by software and/or hardware, and may be configured in a device where it needs to be performed, for example, the apparatus may be configured in a robot. The localization method provided by embodiments of the present disclosure is suitable for scenarios where loop closure detection and/or relocalization are performed. As shown in FIG. 1, the localization method provided by the present embodiments may include:

S101, acquiring a target local semantic point cloud map at a current position, a global semantic grid map, and a laser point cloud map, wherein each grid of the global semantic grid map records a value of probability that a target semantic object exists in the grid.

The localization method provided by the present embodiment may be applied to perform a relocalization/loop closure detection on any device that needs to perform the relocalization/loop closure detection, and in particular may be applied to perform the relocalization/loop closure detection on a robot, which is illustrated below as an example. A semantic point cloud map may be a two-dimensional map composed of semantic point clouds, which may be a multi-channel map, with each channel corresponding to a category of semantic objects, i.e., point clouds of different categories of semantic objects may be located in different channels. Accordingly, the target local semantic point cloud map may be a point cloud map composed of semantic point clouds collected by the robot within a range of certain distance (e.g., 15 m, etc.) near the current position. The global semantic grid map may be a grid map corresponding to a global semantic point cloud map of the robot in the current scenario, the global semantic grid map has a plurality of channels, and the probability value recorded in each grid of each channel may be the probability that a semantic object of a semantic category corresponding to the channel exists in the respective grid. The laser point cloud map may be a two-dimensional map composed of laser point clouds, which may include a local laser point cloud map and/or a global laser point cloud map. The local laser point cloud map may be a point cloud map composed of laser point clouds collected by the robot within a certain distance near the current position, and the global laser point cloud map may be a global map employed by the robot to navigate in the current scenario and composed of laser point clouds.

In this embodiment, the robot can collect a frame of laser point cloud at intervals of a preset time or a set distance during operation, extract points in a plurality of frames of laser point clouds collected within a certain distance range whose local curvatures are less than a threshold value as planar feature points, and according to the robot's pose at the time of collection of each frame of laser point cloud, obtain two-dimensional coordinates of each planar feature point in a map coordinate system, and then obtain the laser point cloud map for the robot. At the same time, the robot may also use an image capture apparatus to perform image capture during operation, perform object identification and semantic segmentation on the captured image, estimate center point coordinates of a foreground semantic object and a three-dimensional point cloud of a background semantic object in the image, project them to a horizontal plane, and according to the pose of the robot at the time of image capture, convert the projected center point and three-dimensional point cloud to the robot's map coordinate system, and obtain two-dimensional coordinates of the foreground semantic object and the background semantic object in the map coordinate system, and thereby obtain a semantic point cloud map of the robot. Among them, the preset time and the set distance may be set as desired, for example, the preset time may be set to 0.5 s or 1 s, etc., and the set distance may be set to 0.4 m or 0.5 m, etc.; the foreground semantic object may be a countable object, such as a table or a chair, etc.; and the background semantic object may be an uncountable object, such as wall or passable region, etc.

During the process of loop closure detection/relocalization, when the current condition meets a triggering condition of localization, the robot can acquire semantic point clouds collected by the robot within a certain distance range nearby (including at the current position) to constitute the target local semantic point cloud map, the global semantic grid map corresponding to the global semantic map when the robot performs loop closure detection/relocalization, as well as the laser point cloud map of the robot (e.g. a local laser point cloud map collected by the robot within a certain distance range nearby and/or a global laser point cloud map when the robot performs loop closure detection/relocalization).

In the present embodiment, only one one-level global semantic grid map may be acquired, or a plurality of global semantic grid maps at different levels may be acquired, for determining a candidate pose based on the acquired global semantic grid map(s) in subsequent operations, and the present embodiment does not limit this. In order to ensure comprehensiveness of the acquired candidate pose and to reduce the amount of computation required in determining the candidate pose, a plurality of global semantic grid maps at different levels may be acquired and the candidate pose may be determined based on the plurality of global semantic grid maps in subsequent operations, said acquiring a target local semantic point cloud map at a current position, a global semantic grid map, and a laser point cloud map, including: acquiring a target local semantic point cloud map at the current position, global semantic grid maps at at least two levels, and a laser point cloud map, wherein the global semantic grid maps at different levels have different resolutions.

In one embodiment, before said acquiring a target local semantic point cloud map at the current position, global semantic grid maps at at least two levels, and a laser point cloud map, the method further includes: generating the global semantic grid maps at at least two levels based on a global semantic point cloud map.

The global semantic point cloud map can be a multi-channel map, with each channel corresponding to a semantic object of a semantic category, and the global semantic point cloud map can be obtained in a corresponding way according to different tasks currently being performed, for example, if the task currently being performed is the loop closure detection, the semantic point cloud map being constructed by the robot can be used as the global semantic point cloud map; if the task currently being performed is relocalization, a pre-saved globale semantic point cloud map for the current environment can be acquired from a map library.

Before performing the loop closure detection/relocalization, the robot may acquire a global semantic point cloud map for the currently executed task, and perform grid division on each channel of such global semantic point cloud map in accordance with a preset size to obtain a global semantic grid map of the robot, for example, the global semantic point cloud map of each channel may be performed grid division in accordance with a preset grid size corresponding to each level of grid map, and the probability that a semantic object of semantic category corresponding to the respective channel exists in each grid can be calculated, thereby obtaining the global semantic grid map of the robot at each level; alternatively, when the grid sizes of two levels of grid maps are in a multiple relationship, the grid size of the grid map with the smaller grid size (i.e., larger resolution) may be adopted to perform grid division on the global semantic point cloud map to obtain the grid map with the smaller grid size, and the grid map with the smaller grid size is downsampled in accordance with the multiple relationship between the grid sizes of the two levels of grid maps to obtain another grid map with a larger grid size, which is not so limited by the present embodiments.

In this embodiment, since there are a plurality of channels in the global semantic grid map, each channel corresponding to a semantic category, and each grid stores the probability of a semantic object of the semantic category existing at the position therein, there is no need to perform data association on objects detected in different frames, which can simplify the localization process of the robot.

In order to ensure that each grid in a high-level semantic grid map has a unique corresponding grid in a low-level semantic grid map, and to reduce the amount of computation required in generating each level of global semantic grid map, the present embodiment may set the grid sizes of grid maps at adjacent levels to be a multiple relationship, and the low-level grid map can be downsampled so as to obtain the grid map at a higher level adjacent to the level of the low-level grid map, the generating global semantic grid maps at at least two levels based on a global semantic point cloud map includes: performing grid division on the global semantic point cloud map according to a preset size, and determining a probability of existence of a target semantic object in each grid to obtain a global semantic grid map at the lowest level; down-sampling said global semantic grid map at the lowest level at least once, and the global semantic grid map obtained by down-sampling each time serves as the global semantic grid map at the corresponding level.

The preset size can be interpreted as length and width of a grid corresponding to the global semantic grid map at the lowest level, which can be set flexibly, for example, the length and width can be the same or different, and in the present embodiment, the length and width can be the same, for example, the preset size can be 0.2 m×0.2 m, 0.4 m×0.4 m, or 0.5 m×0.5 m, and so on. The number of levels of the global semantic grid maps may be set as desired, for example, it may be 3, 4 or 5, etc. The following describes an example that grids of a grid map are positively oriented and the acquired global semantic grid map has 5 levels.

A global semantic point cloud map may first be acquired, the global semantic point cloud map is performed grid division according to a preset size c×c, and a probability value saved in each grid is initialized to 0; and for each semantic category of point cloud in the global semantic point cloud map, the probability value saved in each grid in a channel corresponding to the semantic category is updated respectively, so as to obtain a global semantic grid map at the lowest level. Then, the global semantic grid map at the lowest level is downsampled multiple times (e.g., 4 times) with a window size of n×n (e.g., n=2, 3, or 4, etc.) and a step size of n to obtain global semantic grid map at multiple levels.

Taking c=0.2 m, n=2 and the number of grid levels is 5 as an example, to generate the global semantic grid map, we can first obtain a global semantic point cloud map of the robot, perform grid division on each channel of the global semantic point cloud map in accordance with 0.2 m×0.2 m (i.e., the actual distance corresponding to each divided grid is 0.2 m×0.2 m), and initialize a probability value saved in each grid within the grid map of each channel is 0. Then, for each semantic category t (e.g., table, chair, wall, or passable area, etc.) of point cloud, each point $p=(x_j, y_j)$ in the point cloud is traversed, and during the traversing, the probability value saved in each grid is updated according to the following equation in order to obtain the global semantic grid map at the lowest level (i.e., level 0).

$$G_t[a, b] \leftarrow G_t[a, b] + \text{logit}\left(e^{-\frac{(a^*c-x_j)^2+(b^*c-y_j)^2}{2\sigma^2}}\right) \quad (1)$$

That is, the probability value saved in a grid in the grid map corresponding to a semantic category t is the sum of a logit function for each point in the point cloud of that semantic category t. Wherein, a, b are coordinates of a grid in the grid map, $G_t[a, b]$ is a probability value saved in the grid with coordinates (a, b) in the grid map of a channel corresponding to the semantic category t; the function $$\text{logit}(p) = \log\left(\frac{p}{1-p}\right);$$

$\sigma$ is a variance of a Gaussian distribution, which can be set as needed, e.g., $\sigma$ can be set to a value such as 0.5 or 0.15, and in this embodiment, $\sigma$ can be set to 0.5; and c is the actual distance corresponding to each grid in the grid map.

In addition, in order to reduce the amount of computation and speed up the localization, after the global semantic grid map at the lowest level is calculated by using the equation (1), the probability value saved in each grid of each channel in the global semantic grid map can also be updated according to the following equation.

$$G_t[a, b] \leftarrow \max\left(0, \frac{1}{1+e^{-G_t[a,b]}} - 0.5\right) \quad (2)$$

When the global semantic grid map at the lowest level is obtained, a maximum pooling with a window of 2×2 and a step size of 2 can be performed on the grid map at this lowest level, and the probability value saved in one grid of a low-resolution global semantic grid map is determined to be a maximum of probability values saved in its corresponding 4 grids within the grid map at a lower level, so that a first level of grip map whose grid size (e.g., 0.4 m×0.4 m) is twice the grid size of the global semantic grid map at the lowest level can be obtained; and a maximum pooling with a window of 2×2 and a step size of 2 can be performed again on the first level of grid map to obtain a second level of grip map whose grid size (e.g., 0.8 m×0.8 m) is four times the grid size of the global semantic grid map at the lowest level, and so forth, so that a third level of grip map whose grid size (e.g., 1.6 m×1.6 m) is eight times the grid size of the global semantic grid map at the lowest level, as well as a fourth level of grip map whose grid size (e.g., 3.2 m×3.2 m) is sixteen times the grid size of the global semantic grid map at the lowest level can be obtained.

As a result, it is possible to obtain multiple levels of global semantic grid maps which each has a resolution being 1/2i (i=0, 1, 2, 3, 4) of the resolution of the lowest level of grid map.

In this embodiment, a semantic point cloud map within a certain range obtained by projection (i.e., the local semantic point cloud map) can be directly used as the target local semantic point cloud map; the points within the local semantic point cloud map obtained by projection can also be downsampled, for example, the feature points of each foreground semantic object and feature points of each background semantic object can be downsampled by using pre-set identical or non-identical downsampling, respectively, so as to reduce the number of localized point clouds when the robot performs loop closure detection/relocalization and improve the localization speed.

In one embodiment, before acquiring a target local semantic point cloud map at a current position, global semantic grid maps at at least two levels, and a laser point cloud map, the method further includes: obtaining a first feature point of each foreground semantic object and a second feature point of each background semantic object in an original local semantic point cloud map at the current location; downsampling the first feature points and the second feature points by using different manners of downsampling, and constructing the target local semantic point cloud map based on downsampled feature points.

The original local semantic point cloud map may be a semantic point cloud map within a certain distance range obtained by projecting a center point of each foreground semantic object and point clouds of each background semantic object to a map coordinate system. The first feature point may be a feature point of the foreground semantic object; the second feature point may be a feature point of the background semantic object.

In the above embodiment, a first feature point of each foreground semantic object and a second feature point of each background semantic object can be downsampled by different manners of downsampling, so as to improve the accuracy of the loop closure detection/relocalization of the robot under the premise of improving the localization speed of the robot. Among them, the downsampling manner adopted for downsampling the first feature point of the foreground semantic object and the downsampling manner adopted for downsampling the second feature point of the background semantic object may be selected as desired, which are not limited in the present embodiment.

Optionally, the downsampling the first feature points and the second feature points by using different manners of downsampling, and constructing the target local semantic point cloud map based on downsampled feature points, includes: performing Euclidean distance clustering on a plurality of the first feature points and taking each cluster center after clustering as a first downsampled feature point; performing voxelized downsampling on the second feature points to obtain second downsampled feature points; constructing the target local semantic point cloud map based on the first downsampled feature point and the second downsampled feature point.

Exemplarily, when the current condition meets the loop closure detection/relocalization condition, an original semantic point cloud map of the robot at the current position may be acquired, and for each channel of the original semantic point cloud map, if a semantic object corresponding to the channel is a foreground semantic object, Euclidean distance-based clustering can be performed on a point cloud in the semantic channel to obtain a cluster center of each category the clustering, and the point cloud of the channel is updated to a point cloud composed of respective clustering centers; if the semantic object corresponding to the channel is a background semantic object, then voxelized downsampling can be performed on the point cloud of the channel, and the point cloud of the channel is updated to the point cloud obtained by voxelized downsampling, and after downsampling of point clouds in the multiple channels is completed, a local semantic map composed of the downsampled point clouds in the multiple channels is determined as the target local semantic point cloud map. Herein, a distance threshold for performing the Euclidean distance-based clustering on the point cloud of the foreground semantic object and a voxel size for performing the voxelized downsampling on the point cloud of the background semantic object may be flexibly set as needed, for example, the distance threshold may be set to 0.3 m or 0.4 m, etc., and the voxel size may be set to 0.2 m×0.2 m, and the present embodiment does not impose any limitation thereon.

S102, performing a pose identification based on the target local semantic point cloud map and the global semantic grid map to obtain a set of candidate poses.

The set of candidate poses may be a set composed of candidate poses, which may be poses obtained by coarse localization of the robot based on semantic information of the robot and which may be loop closure detection poses and/or relocalization poses of the robot.

In this embodiment, after acquiring the target local semantic point cloud map and the multiple levels of global semantic grid maps of the robot, coarse localization can be first performed based on the semantic information of the robot in vicinity of the current position (e.g., each semantic feature point in the target local semantic point cloud map of the robot at the current position), by way of example, utilizing each semantic feature point in the target local semantic point cloud map to evaluate each grid in the global semantic grid map, e.g., using a branch and bound method to search in the global semantic grid map at each level to initially identify the grids where the target pose may exist, to reduce the amount of computation required in determining the target pose of the robot by using the laser point cloud map, avoid the need to match a large number of points during loop detection/relocalization using the laser point cloud map directly, and realize the loop detection/relocalization in an efficient manner.

Exemplarily, after acquiring the target local semantic point cloud map and the multiple levels of global semantic grid maps, each grid in a global semantic grid map with the lowest resolution may be taken as a to-be-identified grid, semantic information of each semantic feature point in the target local semantic point cloud map is employed to determine a grid in each to-be-identified grid in which a target pose may exist, a grid in an adjacent global semantic grid map at next level corresponding to the identified grid is determined as a new to-be-identified grid, and return to the operation that the semantic information of each semantic feature point in the target local semantic point cloud map is employed to determine a grid in each to-be-identified grid in which a target pose may exist, until there is no an adjacent global semantic grid map at next level for the to-be-identified grid, and when there is no corresponding grid in an adjacent global semantic grid map at next level for the to-be-identified grid, i.e., when the to-be-identified grid is a grid located in the global semantic grid map with the highest resolution, the candidate pose can be determined based on the grid identified in the global semantic grid map with the highest resolution in which the candidate pose may exist.

In one embodiment, the performing a pose identification based on the target local semantic point cloud map and the global semantic grid map to obtain a set of candidate poses, includes: acquiring a target grid stack including grids with a probability value of greater than zero in the global semantic grid map at the highest level, wherein the level of each global semantic grid map is negatively correlated with the resolution; calculating, based on the target local semantic point cloud map, a first evaluation index for each grid in the target grid stack and a first evaluation index value for at least one grid in another level of global semantic grid map, and determining, based on the first evaluation index value, a candidate pose to obtain a set of candidate poses.

The target grid stack may be interpreted as a stack that records grid information about each grid recorded in the global semantic grid map at the highest level which has a probability value greater than zero, the grid information may be a ternary (a, b, i) composed of coordinates (a, b) of the grid in the global semantic grid map to which the grid belongs and the level i of the global semantic grid map to which the grid belongs. The first evaluation index value may be used to evaluate the likelihood of the existence of a candidate pose within each grid, which may be positively correlated with a probability value that each semantic feature point in a local semantic point cloud map (including a target local point cloud map, a map obtained by rotating and/or translating the target local semantic point cloud map) is saved in a corresponding grid in the global semantic grid map in which the respective grid is located.

In the above embodiment, when semantic information about each semantic feature point in the target local semantic point cloud map is employed to determine the grid in the highest-level of global semantic grid map where the target pose may exist, it can only to identify the saved grid with a non-zero probability value of the existence of semantic objects of the corresponding semantic category, so that the amount of computation required in the coarse localization of the robot using the semantic information can be reduced, and the robot's localization speed can be improved.

The robot creates an empty grid stack and based on a probability value recorded in each grid within the global semantic grid map at the highest level that a semantic object of the corresponding semantic category exists in the grid, adds the reorded grid information (such as, a ternary) about the grid whose probability value is non-zero to the grid track as a target grid track, utilizes a plurality of semantic feature points in the target local semantic point cloud map to sequentially evaluate each grid in the target grid stack whose probability value is non-zero so as to obtain a first evaluation index value for each grid, and determines a candidate pose based on the grid for which the first evaluation index value is greater than a first index threshold, for example, determining the candidate pose directly based on the first evaluation index for a grid in the grid map at the lowest level corresponding to the grid in the target grid stack for which the first evaluation index value is greater than the first index threshold; or in order of levels from high to low, sequentially judging whether, for a grid in a global semantic grid map at a high level for which the first evaluation index value is greater than the first index threshold, the first evaluation index for each corresponding grid in a global semantic grid map at an adjacent low level is still greater than the first evaluation index threshold or not, until the judgment reaches the grids in the global semantic grid map at the lowest level and determining the poses corresponding to the grid in the global semantic grid map at the lowest level for which the first evaluation index is greater than the first index threshold as the candidate poses.

In the present embodiment, for creation of the target grid stack, the acquired grid recorded in the global semantic grid map at the highest level which has a probability value is non-zero can be directly added to the target grid stack; or an expansion operation can be performed on the grid with a non-zero probability value in the global semantic grid map at the highest level and the expanded grid with the non-zero probability value in the global semantic grid map can be added to the target grid stack, to improve the comprehensiveness of candidate poses to be identified subsequently and avoid missing identification. Herein, when performing an expansion operation on a grid in the global semantic grid map whose probability value is non-zero, by taking the grid as a cernter, a grid whose distance from the grid is within a set distance (e.g., 10 m, etc.) and whose probability value is zero can be labeled as having a probability value that is non zero, e.g., by modifying the stored probability value of a grid whose distance from the grid is within a set distance and whose probability value is zero to a preset probability value that is non zero, such as modifying its probability value to a probability value such as 0.5 or 1.

S103, determining a target pose based on the laser point cloud map and the set of candidate poses, wherein the target pose includes a loop closure pose and/or a relocalization pose.

In the present embodiment, after coarse localization of the robot using the semantic information, fine localization of the robot may be performed by using the laser point cloud, to judge whether a target pose is contained in the candidate pose identified by using the semantic information and a vicinity of the candidate pose and to determine the target pose when it is judged that the vicinity of the candidate pose thereof contains the target pose.

Exemplarily, with respect to each candidate pose in the set of candidate poses, it can sequentially utilize an Iterative Closest Point algorithm to match the local laser point cloud map and the global laser point cloud map, and select a predetermined number (e.g., one or more) of candidate poses as target poses in order of the number of matching points from high to low, and it also can calculate an average candidate pose of multiple candidate poses in the set of candidate poses, discretize multiple pose parameters of the average candidate pose within a certain range, and use the Iterative Closest Point (ICP) algorithm to match the local laser point cloud maps and the global laser point cloud maps for each of the discretized poses, and select a preset number of discretized poses as the target poses in order of the number of matching points from high to low.

The localization method provided in the present embodiment can acquire a target local semantic point cloud map at a current position, a global semantic grid map, and a laser point cloud map, each grid of the global semantic grid map recording a value of probability that a target semantic object exists in the grid; perform pose identification on the basis of the target local semantic point cloud map and the global semantic grid map to obtain a set of candidate poses; and determine a loop closure pose and/or a relocalization pose of the robot according to the laser point cloud map and the set of candidate poses. By employing the above technical scheme, the present embodiment can first utilize the semantic information to coarsely localize the robot, and then utilize the information about the laser point cloud to finely localize the robot, which can not only reduce the amount of computation required in the localization process and improve the speed of loop closure detection/relocalization, but also can improve the accuracy of the loop closure detection/relocalization and reduce the fals detection rate.

Figure 2:
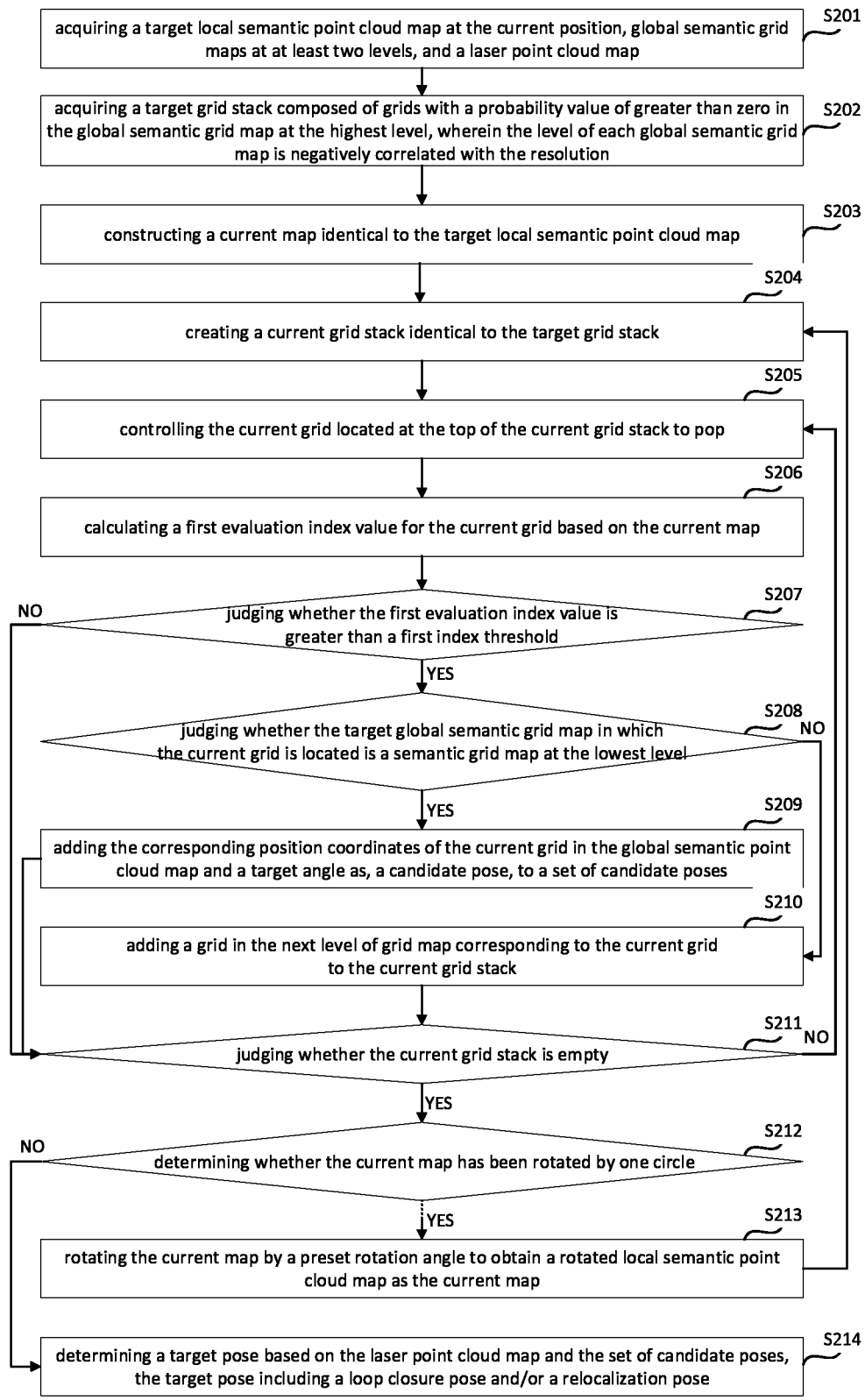
FIG. 2 shows a schematic flow chart of another localization method provided by embodiments of the present disclosure.

FIG. 2 shows a schematic flow chart of another localization method provided by an embodiment of the present disclosure. The scheme in the present embodiment may be combined with one or more optional schemes in the above embodiment. Optionally, the calculating, based on the target local semantic point cloud map, a first evaluation index for each grid in the target grid stack and a first evaluation index value for at least one grid in another level of global semantic grid map, and determining, based on the first evaluation index values, a candidate pose to obtain a set of candidate poses, includes: constructing a current map identical to the target local semantic point cloud map; creating a current grid stack identical to the target grid stack, and controlling a current grid located at the top of the current grid stack to pop; calculating a first evaluation index value for the current grid based on the current map; if the first evaluation index value is greater than a first index threshold, judging whether the target global semantic grid map in which the current grid is located is a semantic grid map at the lowest level or not, and if the target global semantic grid map in which the current grid is located is the semantic grid map at the lowest level, adding a target angle and corresponding position coordinates of the current grid in the global semantic point cloud map into the set of candidate poses as a candidate pose, and if the target global semantic grid map in which the current grid is located is not the semantic grid map at the lowest level, adding a corresponding grid of the current grid in the grid map at the next level into the current grid stack; returning to perform the operation of controlling the current grid located at the top of the current grid stack to pop, until the current grid stack is empty; wherein the target angle is an angle of rotation of the current map in relation to the target local semantic point cloud map; and if the first evaluation index value is less than or equal to the first index threshold, returning to perform an operation of controlling the current grid located at the top of the current grid stack to pop, until the current grid stack is empty.

Optionally, the localization method provided in the present embodiment may further include: when the current grid stack is empty, rotating the current map by a preset rotation angle, obtaining a rotated local semantic point cloud map as the current map, and returning to perform the operation of creating a current grid stack identical to the target grid stack, until the current map is rotated by one circle.

Accordingly, as shown in FIG. 2, the localization method provided by the present embodiment may include:

S201, acquiring a target local semantic point cloud map at the current position, global semantic grid maps at at least two levels, and a laser point cloud map, wherein each grid of the global semantic grid map records a probability value of a target semantic object existing in the grid.

S202, acquiring a target grid stack composed of grids with a probability value of greater than zero in the global semantic grid map at the highest level, wherein the level of each global semantic grid map is negatively correlated with the resolution.

S203, constructing a current map identical to the target local semantic point cloud map.

In this embodiment, the target local semantic point cloud map may be duplicated as the current map, and subsequent operations may be performed based on the current map, so as to prevent the subsequent operations from affecting the target local semantic point cloud map.

S204, creating a current grid stack identical to the target grid stack.

It can construct an empty stack as the current grid stack and duplicate the target grid stack to this current grid stack, i.e., writing the grid information (i.e., ternary) of each grid stored in the target grid stack into the current grid stack, so as to prevent the subsequent pushing and poping operations from affecting the target grid stack.

S205, controlling the current grid located at the top of the current grid stack to pop.

It can treat a grid located at the top of the current grid stack as the current grid, and control the current grid to pop, i.e., taking out the grid located at the top of the current grid stack from the current grid stack, and treating the taken-out grid as the current grid.

S206, calculating a first evaluation index value for the current grid based on the current map.

After determining the current map and the current grid, the first evaluation index for the current grid may be calculated based on the current map, for example, calculating the first evaluation index based on a probability value corresponding to each feature point within the current map and/or a degree of mismatch between the current map and a global semantic grid map (or a global semantic point cloud map) in which the current grid is located, in order to evaluate the current grid.

In one embodiment, the calculating a first evaluation index value for the current grid based on the current map includes: translating the current map to move a corresponding coordinate point of the current grid in the current map to an origin position, to obtain a translated map; acquiring a probability value that is recorded in a grid in the target global semantic grid map corresponding to each semantic feature point within the translated map, as a probability value of the semantic feature point; calculating the first evaluation index value for the current grid based on the probability value of each semantic feature point.

The translated map can be a map obtained by translating the current map. The target global semantic grid map may be a global semantic grid map at a corresponding level in which the current grid is located.

In the above embodiment, in calculating the first evaluation index value for the current grid, the current map may first be translated based on the current grid, for example, translating a coordinate point corresponding to the current grid in the current map to an origin position of the map coordinate system, in order to calculate the first evaluation index by using the coordinate point as the origin.

Exemplarily, the first evaluation index value score1 of the current grid (a, b) can be initialized to 0 firstly, and based on the actual distance $c_i$ in the target global semantic grid map corresponding to each grid, the actual position $x_m/c_i$, $y_m/c_i$ corresponding to the grid center of the current grid can be calculated, $y_i = b \cdot c_i$, and the current map is translated xi along the x-axis of the map coordinate system, and is translated $y_i$ along the y-axis of the map coordinate system, and a translated map can be obtained; and then for each semantic feature point in the translated map (assuming the coordinates are ($x_m$, $y_m$)), a grid in the target global semantic grid map corresponding to the semantic feature point can be determined according to the position coordinates of the semantic feature point, for example, determining a grid located at the position coordinates in the target global semantic grid map ($x_m/c_i$, $y_m/c_i$) as the grid in the target global semantic grid map corresponding to the semantic feature point, and taking the probability value recorded in the grid as the probability value of the semantic feature point; in turn, the first evaluation index value for the current grid may be calculated based on the probability value of each semantic feature point in the translated map, such as taking the average or median value of the probability values of multiple semantic feature points in the translated map as the first evaluation index value for the current grid.

In this embodiment, in calculating the first evaluation index value for a grid, in addition to considering the probability value of each semantic feature point in the current map, the degree of mismatch between the current map and the global semantic grid map (or the global semantic point cloud) may also be considered, e.g., in the case where the grid is located within any level of global semantic grid map, or, only in the case where the grid is located within the global semantic grid map at the lowest level, the first evaluation index value for the grid is calculated based on the probability value of each semantic feature point in the current map and the degree of mismatch between the current map and the global semantic grid map, in order to improve the accuracy of an candidate pose to be identified subsequently.

Since in determining the first evaluation index for a grid located in a global semantic grid map at a level other than the lowest level, the first evaluation index is only used to determine whether the first evaluation index for its corresponding grid in the global semantic grid map at the upper level needs to be calculated, i.e., only the upper boundary of the first evaluation index needs to be taken into account, it is possible to, only when the grid is located within the global semantic grid map at the lowest level, calculate the first evaluation index value for the grid based on the probability value of each semantic feature point in the current map and the degree of mismatch between the current map and the global semantic grid map. The calculating the first evaluation index value for the current grid based on the probability value of each semantic feature point, includes: if the target global semantic grid map is not a semantic grid map at the lowest level, then calculating a probability average for a plurality of semantic feature points based on the probability value of each semantic feature point, as the first evaluation index value for the current grid; and if the target global semantic grid map is the semantic grid map at the lowest level, then calculating a probability average of the plurality of semantic feature points and a penalty function average based on the probability value of each semantic feature point, and take the difference between the probability average and the penalty function average as the first evaluation index value for the current grid, wherein the penalty function average is used to characterize the degree of mismatch between the current map and the target global semantic grid map.

Exemplarily, in calculating the first evaluation index value for the current grid based on the current map, it may be judged whether the target global semantic grid map in which the current grid is located is a semantic grid map at the lowest level or not, for example, determining whether the level i in the ternary corresponding to the current grid is zero, and if the level i in the ternary corresponding to the current grid is zero, calculating the first evaluation index value for the current grid based on the probability value of each semantic feature point in the current map, for example, all semantic feature points in the current map can be traversed, when each semantic feature point is traversed, the following equation (3) is used to update the first evaluation index value for the current grid, and the first evaluation index value after all semantic feature points have been traversed is taken as the first evaluation index value for the current grid; if the level i in the ternary corresponding to the current grid is not zero, calculating the probability average of a plurality of semantic feature points and the penalty function average based on the probability value of each semantic feature point in the current map, and calculating the first evaluation index value for the current grid based on the probability average and the penalty function average, for example, all semantic feature points in the current map can be traversed, when each semantic feature point is traversed, the following equation (4) is used to update the first evaluation index value for the current grid, and the first evaluation index value after all semantic feature points have been traversed is taken as the first evaluation index value for the current grid.

$$\text{score1} \leftarrow \text{score1} + \frac{1}{N_{P_t}} G_{it}[x_m/c_i, y_m/c_i] \quad (3)$$

$$\text{score1} \leftarrow \text{score1} + \frac{1}{N_{P_t}} G_{it}[x_m/c_i, y_m/c_i] - \sum_{k \neq t} \frac{1}{N_{P_t}} \alpha_k G_{ik}[x_m/c_i, y_m/c_i] - \frac{1}{N_{P_t}} \beta_k \cdot I(G_{it}[x_m/c_i, y_m/c_i] = 0) \quad (4)$$

score1 is the first evaluation index value for the current grid. $N_{P_t}$ is the number of semantic feature points contained in a semantic point cloud map in the target local semantic point cloud map corresponding to a semantic category t. $G_{it}[x_m/c_i, y_m/c_i]$ is the probability value saved in a corresponding grid ($x_m/c_i$, $y_m/c_i$) of the currently traversed semantic feature point ($x_m$, $y_m$) in a grid map within the global semantic grid map at the ith level corresponding to semantic category t.

$$\sum_{k \neq t} \frac{1}{N_{P_t}} \alpha_k G_{ik}[x_m/c_i, y_m/c_i]$$

and I are penalty functions for the current grid, $$\sum_{k \neq t} \frac{1}{N_{P_t}} \alpha_k G_{ik}[x_m/c_i, y_m/c_i]$$

is used to represent a case that each semantic feature point in the translated map corresponds to a different semantic object from the corresponding semantic feature point in the global semantic point cloud map; the penalty function I is used to represent a case that the semantic feature point in the translated map does not have a corresponding semantic feature point in the global semantic point cloud map, if $G_{it}[x_m/c_i, y_m/c_i] 32\ 0$, then $I(G_{it}[x_m/c_i, y_m/c_i]=0)=1$, if $G_{it}[x_m/c_i, y_m/c_i] \neq 0$, then $I(G_{it}[x_m/c_i, y_m/c_i]=0)=0$. $\alpha_k$ and $\beta_k$ are predefined coefficients, which can be set as needed, for example, $\alpha_k$ and $\beta_k$ can be set so that $\alpha_k=1$, $\beta_k=0.05$.

S207, judging whether the first evaluation index value is greater than a first index threshold, if the first evaluation index value is greater than the first index threshold, then execute S208; if the first evaluation index value is not greater than the first index threshold, then execute S211.

S208, judging whether the target global semantic grid map in which the current grid is located is a semantic grid map at the lowest level, if the target global semantic grid map in which the current grid is located is a semantic grid map at the lowest level, then perform S209; if the target global semantic grid map in which the current grid is located is not a semantic grid map at the lowest level, then perform S210.

S209, adding the corresponding position coordinates of the current grid in the global semantic point cloud map and a target angle as, a candidate pose, to a set of candidate poses, then perform S211, wherein the target angle is a rotation angle of the current map relative to the target local semantic point cloud map.

In this embodiment, for determining the candidate poses, all poses for which the first evaluation index value is greater than the first index threshold are added to the set of candidate poses as candidate poses, instead of only retaining the candidate poses with the largest first evaluation index value, whereby subsequentially, the standard deviation of the plurality of candidate poses can be utilized to judge whether the candidate poses in the set of candidate poses are reliable or not, and no further subsequent operations will be carried out when the candidate poses are judged to be unreliable, which can simplify the localization process of the robot.

S210, adding a grid in the next level of grid map corresponding to the current grid to the current grid stack.

In this embodiment, after the first evaluation index value for the current grid is calculated, it can judge whether the first evaluation index value is greater than a first index threshold or not, and if the first evaluation index value is greater than the first index threshold, it is determined that there may be a candidate pose existing in the current grid, and when the current grid is not a grid in the global semantic grid map with the highest resolution, a grid in the global semantic grid map at an upper level with a higher resolution corresponding to the current grid is added to the current grid stack to accurately locate the candidate pose. of the global semantic grid map, the corresponding grid in the higher resolution global semantic grid map is added to the current grid stack to make the position of the candidate pose accurate. Wherein, the first index threshold may be set as desired, which is not so limited in the present embodiment.

When the first evaluation index value for the current grid is greater than the first index threshold, it can judge whether the target global semantic grid map is the lowest level of global semantic grid map, that is, to judge whether the current grid is the most accurate position of the candidate pose that can be determined based on the global semantic grid map; if the target global semantic grid map is the lowest level of global semantic grid map, it can directly determine the candidate pose $(a \cdot c_i, b \cdot c_i, \theta)$ corresponding to the current grid $(a, b)$, and add the candidate pose to the set of candidate poses; if the target global semantic grid map is not the lowest-level of global semantic grid map, then it can determine the grid in the next-level of global semantic grid map corresponding to the current grid and then add the determined grid to the current grid stack, for example, when the resolution of the high-level of global semantic grid map is four times the resolution of its adjacent low-level of global semantic grid map, it can add the ternaries of the determined grids $(a*2, b*2, i-1)$, $(a*2+1, b*2, i-1)$, $(a*2, b*2+1, i-1)$ and $(a*2+1, b*2+1, i-1)$ to the current grid stack and return to execute S205. where, $\theta$ denotes the target angle, i.e., the rotation angle of the current map relative to the target local semantic point cloud map.

S211, judging whether the current grid stack is empty, if the current grid stack is empty, then execute S212; if the current grid stack is not empty, then return to execute S205.

In the present embodiment, when the processing of the current grid is completed, such as after it is judged that the first evaluation index value for the current grid is less than or equal to the first index threshold value (i.e., after it is judged that there is no candidate pose within the current grid), after the grid in the next level of global semantic grid map corresponding to the current grid is added to the current grid stack, or after the candidate pose corresponding to the current grid is added to the set of candidate poses, it can be judged whether the current grid stack is empty or not, and if not, return to execute S205 to traverse all the grids within the current grid stack.

S212, determining whether the current map has been rotated by one circle, if the current map has been rotated by one circle, then execute S213; if the current map is not rotated by one circle, then execute S214.

S213, rotating the current map by a preset rotation angle to obtain a rotated local semantic point cloud map as the current map, and return to execute S204.

The preset rotation angle can be set as desired, e.g. the preset rotation angle can be an angular value such as 5°, 10° or 20°.

In this embodiment, in addition to the pose identification is performed based on the acquired target local semantic point cloud map, the target local semantic point cloud map may be rotated multiple times in accordance with a prest rotation angle, until it is rotated one circle, and the pose identification may be performed based on a plurality of semantic point cloud maps obtained from such multiple rotations, respectively, in order to improve the comprehensiveness of the candidate poses contained in the set of candidate pose set.

When the candidate pose identification based on the current map has been completed, it can be judged whether the current map has been rotated relative to the target local semantic point cloud map one circle or not, for example, it is judged if the current map continues to rotate a preset rotation angle, whether its rotation angle relative to the target local semantic point cloud map has exceeded 360° or not, if the current map continues to rotate a preset rotation angle, its rotation angle relative to the target local semantic point cloud map has exceeded 360°, then it can be determined that the current map has been rotated one circle, and the candidate pose identification has been completed, and the current map is no longer rotated; if the current map continues to rotate a preset rotation angle, its rotation angle relative to the target local semantic point cloud map has not exceeded 360°, then it is possible to continue to rotate the current map by the preset rotation angle, and take the rotated local semantic point cloud map as the current map, and the above operations are repeated so that the candidate pose identification can be performed based on the rotated local semantic point cloud map.

S214, determining a target pose based on the laser point cloud map and the set of candidate poses, the target pose including a loop closure pose and/or a relocalization pose.

In the localization method provided in the present embodiment, only when it is determined a first evaluation index value for a grid of a high-level global semantic grid map is greater than a first index threshold, a corresponding grid in the global semantic grid map at a lower level would be calculated, however, if a first evaluation index value for a grid of a high-level global semantic grid map is smaller than or equal to a first index threshold, a corresponding grid in the global semantic grid map at a lower level need not to be calculated, and the efficiency of loop closure detection/ relocalization can be improved. Furthermore, by rotating the target local semantic point cloud map, the comprehensiveness of the determined candidate poses, and in turn, the accuracy of loop closure detection/relocalization can be improved and the false detection rate can be reduced.

Figure 3:
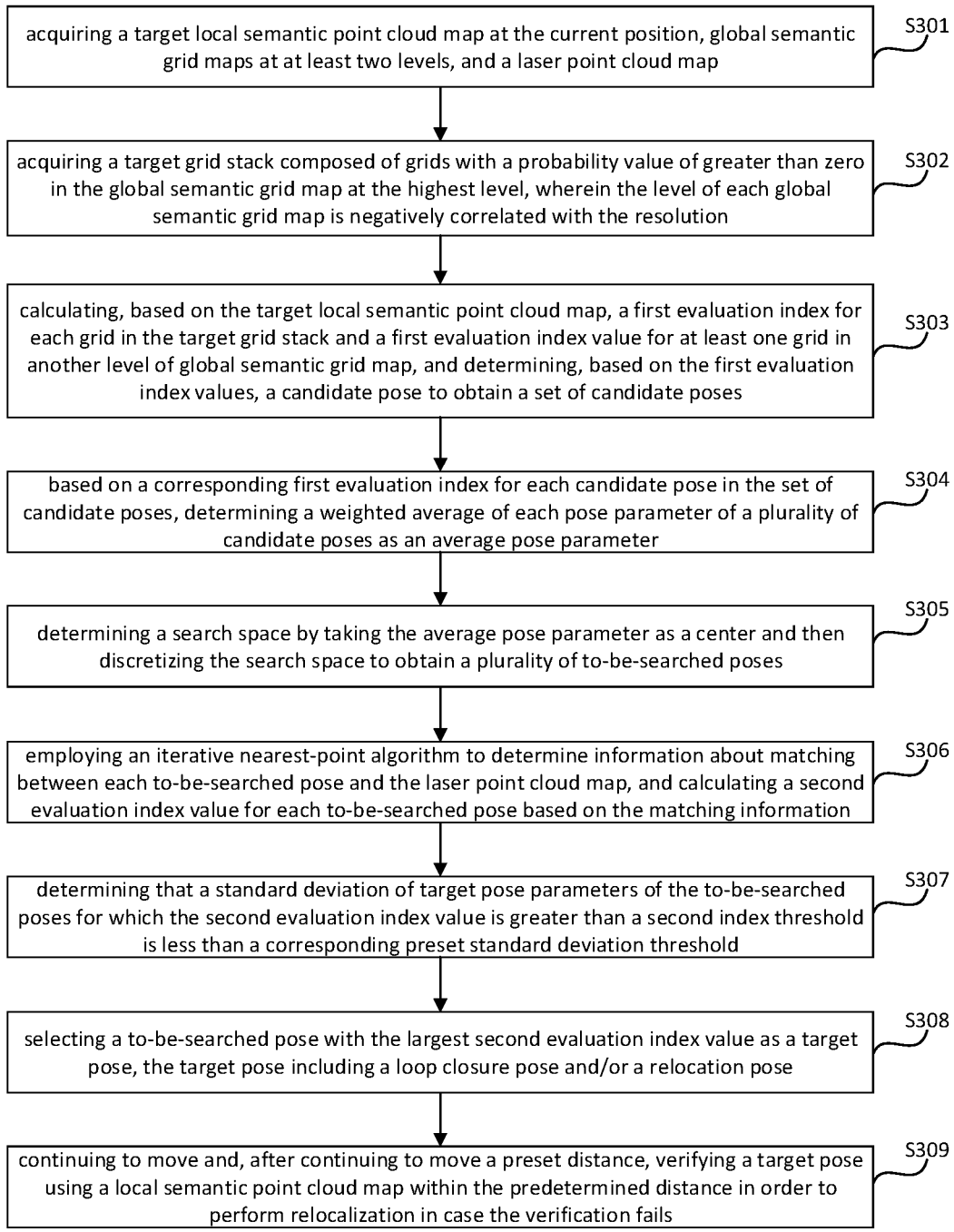
FIG. 3 shows a schematic flow chart of yet another localization method provided by embodiments of the present disclosure.

FIG. 3 shows a schematic flow chart of yet another localization method provided by an embodiments of the present disclosure. The scheme in this embodiment may be combined with one or more optional schemes in the above embodiments. Optionally, the determining a target pose based on the laser point cloud map and the set of candidate poses, includes: based on a corresponding first evaluation index for each candidate pose in the set of candidate poses, determining a weighted average of each pose parameter of a plurality of candidate poses as an average pose parameter and determining a search space by taking the average pose parameter as a center and then discretizing the search space to obtain a plurality of to-be-searched poses; employing an iterative nearest-point algorithm to determine information about matching between each to-be-searched pose and the laser point cloud map, and calculating a second evaluation index value for each to-be-searched pose based on the matching information; and selecting a to-be-searched pose with the largest second evaluation index value as a target pose.

Optionally, before the selecting a to-be-searched pose with the largest second evaluation index value as a target pose, the method further includes: determining that a standard deviation of target pose parameters of the to-be-searched poses for which the second evaluation index value is greater than a second index threshold is less than a corresponding preset standard deviation threshold.

Optionally, after the determining a target pose based on the laser point cloud map and the set of candidate poses, the method further includes: continuing to move and, after continuing to move a preset distance, verifying a target pose using a local semantic point cloud map within the predetermined distance in order to perform relocalization in case the verification fails.

Accordingly, as shown in FIG. 3, the localization method provided by the present embodiment may include:
S301, acquiring a target local semantic point cloud map at the current position, global semantic grid maps at at least two levels, and a laser point cloud map, wherein each grid of the global semantic grid map records a probability value of a target semantic object existing in the grid.
S302, acquiring a target grid stack composed of grids with a probability value of greater than zero in the global semantic grid map at the highest level, wherein the level of each global semantic grid map is negatively correlated with the resolution.
S303, calculating, based on the target local semantic point cloud map, a first evaluation index for each grid in the target grid stack and a first evaluation index value for at least one grid in another level of global semantic grid map, and determining, based on the first evaluation index values, a candidate pose to obtain a set of candidate poses.
S304, based on a corresponding first evaluation index for each candidate pose in the set of candidate poses, determining a weighted average of each pose parameter of a plurality of candidate poses as an average pose parameter.

In this step, a weighted average value of each pose parameter of the plurality of candidate poses may be calculated so that the calculated average pose parameter is closer to the pose parameter of the candidate pose with the higher value of the first evaluation index, to ensure that when the target pose exists, the target pose can be covered in a subsequently determined search space, i.e., to ensure that the target pose that exists can be detected subsequently, to avoid avoid missing detection. A first evaluation index value for each candidate pose may be used as a weight, to calculate a weighted average $\bar{x}$ of x-axis coordinates of the plurality of candidate poses in the set of candidate poses, a weighted average $\bar{y}$ of y-axis coordinates of the plurality of candidate poses, and a weighted average $\bar{\theta}$ of angles $\theta$ of the plurality of candidate poses, as the average pose parameter.

In this embodiment, after having obtained the set of candidate poses, the average pose parameter of the plurality of candidate poses in the set of candidate poses may be calculated directly without considering a floating condition among the plurality of candidate poses in the set of candidate poses; or the floating situation among the plurality of candidate poses in the set of candidate poses may be considered, and only when the standard deviations of the plurality of pose parameters each is less than a standard deviation threshold corresponding to the pose parameter, the average pose parameter of the plurality of candidate poses in the set of candidate poses is then calculated and the subsequent operation is carried out, while there exits one or more pose parameters whose standard deviations are greater than or equal to the standard deviation threshold corresponding thereto, it can be directly determined that the loop closure detection pose/relocalization pose is not detected at the current moment and the subsequent operation needs not be carried out again, so as to reduce the amount of computation required in the process of loop closure detection/relocalization, before based on a corresponding first evaluation index for each candidate pose in the set of candidate poses, determining a weighted average of each pose parameter of a plurality of candidate poses as an average pose parameter, the method further includes: determining that a standard deviation of the plurality of candidate pose parameters each is less than a corresponding standard deviation threshold, wherein the standard deviation threshold corresponding to each pose parameter may be set as desired, for example, the standard deviation threshold corresponding to x may be set to 1 m, the standard deviation threshold corresponding to y may be set to 1 m, the standard deviation threshold corresponding to $\theta$ may be set to 10°, and so on.

S305, determining a search space by taking the average pose parameter as a center and then discretizing the search space to obtain a plurality of to-be-searched poses.

After the average pose parameters are determined, the search space can be determined, with each average pose parameter as the center, in accordance with a pre-set search range corresponding to each pose parameter, and the search space can be then divided in accordance with a pre-set division interval, and different posed obtained by the division can be regarded as the to-be-searched pose. For example, assuming that the average pose parameters are $\bar{x}$, $\bar{y}$ and $\bar{\theta}$, the search range corresponding to each pose parameter is $-d\sim d$, $-d\sim d$ and $-d_\theta\sim d_\theta$, and the division interval corresponding to each pose parameter is $\Delta x$, $\Delta y$ and $\Delta\theta$, then the search space can be determined as {x, y, θ| $\bar{x}-d\le x\le\bar{x}+d$, $\bar{y}-d\le y\le\bar{y}+d$, $\bar{\theta}-d_\theta\le\theta\le\bar{\theta}+d_\theta$}, the search space is divided with the intervals of $\Delta x$, $\Delta y$ and $\Delta\theta$, and x, y and θ corresponding to each of the divided subspaces are treated as the to-be-searched pose, and can be added to a set of to-be-searched poses. Among them, d, $d_\theta$, $\Delta x$, $\Delta y$ and $\Delta\theta$ can be set as needed, for example, it can be set $d=3\Delta x=3\Delta y$, $d_\theta=3\Delta\theta$, and $\Delta x=\Delta y=0.4$ m, $\Delta\theta=5°$.

S306, employing an iterative nearest-point algorithm to determine information about matching between each to-be-searched pose and the laser point cloud map, and calculating a second evaluation index value for each to-be-searched pose based on the matching information.

The matching information may be interpreted as the matching information when matching the laser point cloud map based on each of the to-be-searched poses, which may include the number of matching points and a sum of distances between all matching points. The second evaluation index may be used to assess the likelihood that each to-be-searched pose is a target pose, which may be positively correlated with the degree of matching between the local laser point cloud map and the global laser point cloud map when the to-be-searched position is used as an initial value.

Exemplarily, for each to-be-searched position, taking the pose parameter of the to-be-searched pose as the initial value, a point-to-line based ICP algorithm may be employed to solve coordinate transformation relationship from the planar feature point cloud in the local laser point cloud map to the planar feature point cloud in the global laser point cloud map, and let that the number of matching points at the last iteration of the ICP algorithm ben, and that the sum of the distances between all matching points is l, the second evaluation index value for the to-be-searched pose is calculated based on the number of matching points n and the sum of the distances between all matching points l, for example, the following equation (5) can be used to calculate the second evaluation index value for each to-be-searched pose.

$$\text{score 2} = \frac{l^2 n^2}{n_p^3} \quad (5)$$

score2 is the second evaluation index value, n is the number of matching points at the last iteration, l is the sum of the distances between all matching points at the last iteration, and $n_P$ is the number of planar feature point clouds in the local laser point cloud map.

The usage of a point-to-line based ICP algorithm for alignment is only an exemplary illustration of, and not a limitation of, the present embodiment. The present embodiment may also adopt other point cloud alignment algorithms, such as a point-to-point ICP algorithm, a Normal Distributions Transform (NDT) algorithm, or an alignment method based on point cloud feature description, to perform the alignment. When any algorithm other than the ICP algorithm is used for the alignment, for each pose to be searched, the number of matching points can also be determined after the point cloud alignment is completed (because this step is already included in the ICP algorithm), e.g., the number of matching points is initialized to 0, and for each point in the local laser point cloud map, a point in the global laser point cloud map closest to the point is found and the distance between such two points is calculated, and if the distance is less than a threshold value (e.g., 0.5 m or 1 m, etc.), then the above point in the global laser point cloud map is taken as a matching point for the point in the local laser point cloud map, and the number of match points is increased by 1, and so on, the number of match points corresponding to the to-be-searched pose can be obtained.

S307, determining that a standard deviation of target pose parameters of the to-be-searched poses for which the second evaluation index value is greater than a second index threshold is less than a corresponding preset standard deviation threshold.

Accordingly, if there exist a target pose parameter whose standard deviation is greater than or equal to a corresponding preset standard deviation threshold in target pose parameters of the to-be-searched poses for which the second evaluation index value is greater than a second index threshold, it may be determined that the loop closure detection pose/relocation pose is not detected at the current moment, and no further operation is performed.

The target pose parameter may include one or more of three pose parameters x, y, and θ, for example, x and y may be set as the target pose parameter, or x, y, and θ may all be set as the target pose parameter, and the following takes the target pose parameter including x and y as an example. The second index threshold and the preset standard deviation threshold corresponding to each positional parameter may be set as desired, for example, if the second index threshold may be set to 0.3 or 0.4, etc., and the preset standard deviation threshold corresponding to the positional parameters x and y may be set to 0.8 m or 0.7 m, etc.

Exemplarily, after obtaining the second evaluation index for a to-be-searched pose, it may be judged whether the second evaluation index for the to-be-searched pose is greater than the second index threshold, and if the second evaluation index for the to-be-searched pose is greater than the second index threshold, then the to-be-searched pose may be added to a preset set of poses. Thereby, after adding all the to-be-searched poses for which the second evaluation index is greater than the second index threshold to the preset set of poses, with respect to all the to-be-searched poses in the preset set of poses, it is possible to calculate a standard deviation of x-axis coordinates and a standard deviation of y-axis coordinates of all the to-be-searched poses, and it may be judged that whether that the calculated standard deviation of the x-axis coordinates is smaller than the preset threshold of the standard deviation corresponding to the pose parameter x and the calculated standard deviation of the y-axis coordinates is smaller than the preset threshold of standard deviation corresponding to the pose parameter y is established or not, if it is established that the calculated standard deviation of the x-axis coordinates is smaller than the preset threshold of the standard deviation corresponding to the pose parameter x and the calculated standard deviation of the y-axis coordinates is smaller than the preset threshold of standard deviation corresponding to the pose parameter y, then execute S308; if it is not established that the calculated standard deviation of the x-axis coordinates is smaller than the preset threshold of the standard deviation corresponding to the pose parameter x and the calculated standard deviation of the y-axis coordinates is smaller than the preset threshold of standard deviation corresponding to the pose parameter y, then it can be determined that the loop closure detection position/reorientation position has not been detected at the present moment, and no further operation is performed.

S308, selecting a to-be-searched pose with the largest second evaluation index value as a target pose, the target pose including a loop closure pose and/or a relocation pose.

In the present embodiment, after the second evaluation index for each to-be-searched pose is calculated, the to-be-searched pose with the largest value of the second evaluation index may be selected as the target pose, i.e., the to-be-searched pose with the highest likelihood of being a loop closure detection pose/relocation pose may be selected as the target pose.

The present embodiment does not limit the number of selected target poses, for example, all to-be-searched poses having a second evaluation index value greater than a preset index threshold may also be selected as the target poses, or, in order of the second evaluation index value from large to small, a predetermined number (one or more) of to-be-searched poses may be selected as the target poses.

S309, continuing to move and, after continuing to move a preset distance, verifying a target pose using a local semantic point cloud map within the predetermined distance in order to perform relocation in case the verification fails.

In the present embodiment, after the target pose is determined, the robot may be controlled to continue to move and the determined target pose may be verified by using the semantic information of the robot within a predetermined distance for the continued movement to verify whether the determined target pose is indeed a loop closure detection pose/relocation pose, so that the reliability of the determined loop closure detection/relocalization can be improved.

Exemplarily, the determined target pose can be used as an initial value, and firstly, everytime the robot runs for a certain distance (e.g., 1 m or 1.5 m, etc.), by utilizing the pose increment at the current moment given by the SLAM back-end, the pose of the robot at the current moment can be obtained, the target local semantic grid map of the robot at the current position is acquired, and the first evaluation index value for the pose of the robot at the current moment is calculated in accordance with Equation (4), and so on, within the process of the robot moving a preset distance (e.g., 15 m or 20 m, etc.), the first evaluation index values of a plurality of poses of the robot can be obtained. Then, it can be judged a proportion of poses for which the first evaluation index value is greater than the third index threshold among all poses acquired within the preset distance, and if the proportion is greater than a preset proportion threshold (e.g., 0.8 or 0.9, etc.), then it is determined that the target pose verification passes, and it is considered that the loop closure detection/relocalization is successfully realized; if the proportion is not greater than the preset proportion threshold, then it is determined that the target pose verification fails, i.e., it is determined that the the target pose determined by S308 is incorrect, and S301 may be re-executed to localize the robot again after a time interval. Wherein, this third index threshold is set as needed, for example, the third index threshold can be set to a set ratio (e.g., 4/5, etc.) relative to the first index threshold.

The localization method provided in the present embodiment determines a search space based on a weighted average of the first evaluation indices, determines a second evaluation index value for each control to be searched in the search space based on the laser point cloud data, determines whether there exists a target pose within the search space or not based on the second evaluation value as well as the target pose that may exist, and, after determining the target pose, continues to move and again verifies the target pose based on semantic information of the robot in the preset distance for the continued movement, which can reduce the amount of computation required in the robot localization process and improve the reliability of the determined target pose, ensuring that loop closure detection/relocalization can be efficiently and reliably realized.

Figure 4:
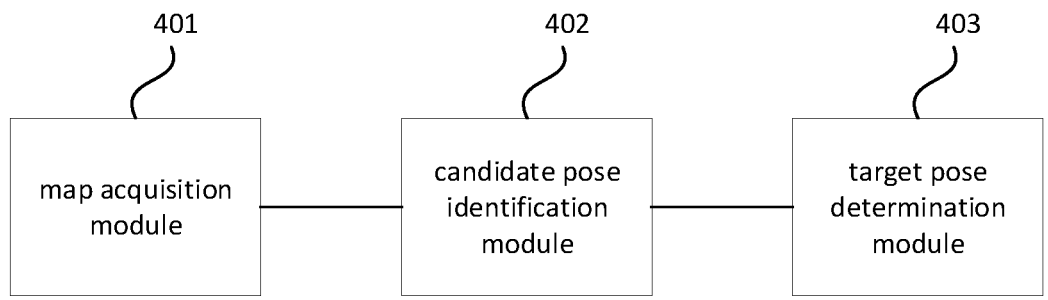
FIG. 4 shows a structural block diagram of a localization apparatus provided by embodiments of the present disclosure.

FIG. 4 shows a structural block diagram of a localization apparatus provided by embodiments of the present disclosure. The apparatus may be implemented by software and/or hardware, may be configured for a robot, e.g., the apparatus may be configured in an indoor robot, and may perform loop closure detection/relocalization by performing a localization method. As shown in FIG. 4, the localization apparatus provided in the embodiment may include: a map acquisition module 401, a candidate pose identification module 402, and a target pose determination module 403, wherein the map acquisition module 401 is configured to acquire a target local semantic point cloud map at a current position, a global semantic grid map, and a laser point cloud map, wherein each grid of the global semantic grid map recording a value of probability that a target semantic object exists in the grid; the candidate pose identification module 402 is configured to perform pose identification on the basis of the target local semantic point cloud map and the global semantic grid map to obtain a set of candidate poses; the target pose determination module 403 is configured to determine a target pose according to the laser point cloud map and the set of candidate poses, the target pose including a loop closure pose and/or a relocalization pose.

The localization apparatus provided in the embodiment can acquire, by the map acquisition module, a target local semantic point cloud map at a current position, a global semantic grid map, and a laser point cloud map, each grid of the global semantic grid map recording a value of probability that a target semantic object exists in the grid; perform, by the candidate pose identification module, pose identification on the basis of the target local semantic point cloud map and the global semantic grid map to obtain a set of candidate poses; and determine, by the target pose determination module, a loop closure pose and/or a relocalization pose of the robot according to the laser point cloud map and the set of candidate poses. By employing the above technical scheme, the present embodiment can first utilize the semantic information to coarsely localize the robot, and then utilize the information about the laser point cloud to finely localize the robot, which can not only reduce the amount of computation required in the localization process and improve the speed of loop closure detection/relocalization, but also can improve the accuracy of the loop closure detection/relocalization and reduce the fals detection rate.

In the above-described scheme, said map acquisition module 401 is configured to: acquire a target local semantic point cloud map at the current position, global semantic grid maps at at least two levels, and a laser point cloud map, wherein the global semantic grid maps at different levels have different resolutions.

In the above-described scheme, the candidate pose identification module 402 may include: a grid stack construction unit configured to acquire a target grid stack including grids with a probability value of greater than zero in the global semantic grid map at the highest level, wherein the level of each global semantic grid map is negatively correlated with the resolution; a candidate pose determination unit configured to calculate, based on the target local semantic point cloud map, a first evaluation index for each grid in the target grid stack and a first evaluation index value for at least one grid in another level of global semantic grid map, and determine, based on the first evaluation index value, a candidate pose to obtain a set of candidate poses.

In the above-described scheme, the candidate pose determination unit may be configured to: construct a current map identical to the target local semantic point cloud map; create a current grid stack identical to the target grid stack, and control a current grid located at the top of the current grid stack to pop; calculate a first evaluation index value for the current grid based on the current map; if the first evaluation index value is greater than a first index threshold, judge whether the target global semantic grid map in which the current grid is located is a semantic grid map at the lowest level or not, and if the target global semantic grid map in which the current grid is located is the semantic grid map at the lowest level, add a target angle and corresponding position coordinates of the current grid in the global semantic point cloud map into the set of candidate poses as a candidate pose, and if the target global semantic grid map in which the current grid is located is not the semantic grid map at the lowest level, add a corresponding grid of the current grid in the grid map at the next level into the current grid stack; return to perform the operation of controlling the current grid located at the top of the current grid stack to pop, until the current grid stack is empty; wherein the target angle is an angle of rotation of the current map in relation to the target local semantic point cloud map; and if the first evaluation index value is less than or equal to the first index threshold, return to perform an operation of controlling the current grid located at the top of the current grid stack to pop, until the current grid stack is empty.

The candidate pose determination unit may be further configured to, when the current grid stack is empty, rotate the current map by a preset rotation angle, obtain a rotated local semantic point cloud map as the current map, and return to perform the operation of creating a current grid stack identical to the target grid stack, until the current map is rotated by one circle.

In the above embodiment, the candidate pose determination unit may include: a translation subunit configured to translate the current map to move a corresponding coordinate point of the current grid in the current map to an origin position, to obtain a translated map; a probability value determination subunit configured to acquire a probability value that is recorded in a grid in the target global semantic grid map corresponding to each semantic feature point within the translated map, as a probability value of the semantic feature point; and an index calculation subunit configured to calculate the first evaluation index value for the current grid based on the probability value of each semantic feature point.

In the above-described scheme, the index calculation subunit is configured to: when the target global semantic grid map is not a semantic grid map at the lowest level, then calculate a probability average for a plurality of semantic feature points based on the probability value of each semantic feature point, as the first evaluation index value for the current grid; and when the target global semantic grid map is the semantic grid map at the lowest level, then calculate a probability average of the plurality of semantic feature points and a penalty function average based on the probability value of each semantic feature point, and take the difference between the probability average and the penalty function average as the first evaluation index value for the current grid, wherein the penalty function average is used to characterize the degree of mismatch between the current map and the target global semantic grid map.

In the above-described scheme, the target pose determination module 403 may include: an average value calculation unit configured to, based on a corresponding first evaluation index for each candidate pose in the set of candidate poses, calculate a weighted average of each pose parameter of a plurality of candidate poses as an average pose parameter, a discretization unit configured to determine a search space by taking the average pose parameter as a center and discretize the search space to obtain a plurality of to-be-searched poses; an index calculation unit configured to employ an iterative nearest-point algorithm to determine information about matching between each to-be-searched pose and the laser point cloud map, and calculate a second evaluation index value for each to-be-searched pose based on the matching information; and a target pose determination unit configured to select a to-be-searched pose with the largest second evaluation index value as a target pose.

The target pose determination module 403 may further include a standard deviation determination unit configured to, before the selection of a to-be-searched pose with the largest second evaluation index value as a target pose, determine that a standard deviation of target pose parameters of the to-be-searched poses for which the second evaluation index value is greater than a second index threshold is less than a corresponding preset standard deviation threshold.

The localization apparatus provided in the present embodiment may further include a grid map generation module configured to, before acquisition of a target local semantic point cloud map at the current position, global semantic grid maps at at least two levels, and a laser point cloud map, generate the global semantic grid maps at at least two levels based on a global semantic point cloud map.

In the above-described scheme, the grid map generation module is configured to: perform grid division on the global semantic point cloud map according to a preset size, and determine a probability of existence of a target semantic object in each grid to obtain a global semantic grid map at the lowest level; down-sample the global semantic grid map at the lowest level at least once, and the global semantic grid map obtained by down-sampling each time serves as the global semantic grid map at the corresponding level.

The localization apparatus provided in the present embodiment may further include: a verification module configured to, after the determination of a target pose based on the laser point cloud map and the set of candidate poses, continue to move and, after continuing to move a preset distance, verify the target pose using a local semantic point cloud map within the predetermined distance in order to perform relocalization in case the verification fails.

The localization apparatus provided in this embodiment may further include: a feature point acquisition module configured to, before the acquisition of a target local semantic point cloud map at a current position, the global semantic grid maps at at least two levels, and a laser point cloud map, acquire a first feature point of each foreground semantic object and a second feature point of each background semantic object in an original local semantic point cloud map at the current location; a downsampling module configured to downsample the first feature points and the second feature points by using different manners of downsampling, and construct the target local semantic point cloud map based on downsampled feature points.

In the above-described scheme, the downsampling module may include: a clustering unit configured to perform Euclidean distance clustering on a plurality of the first feature points and taking each cluster center after clustering as a first downsampled feature point; a voxelization unit configured to perform voxelized downsampling on the plurality of second feature points to obtain second downsampled feature points; and a map construction unit configured to construct the target local semantic point cloud map based on the first downsampled feature point and the second downsampled feature point.

The localization apparatus provided by the present embodiment can be applied to localize a robot.

The localization apparatus provided in the embodiments of the present disclosure may execute the localization method provided in any embodiment of the present disclosure, and have corresponding functional modules and effects for executing the localization method. Technical details not exhaustively described in the present embodiment may refer to the localization method provided in any embodiment of the present disclosure.

Figure 5:
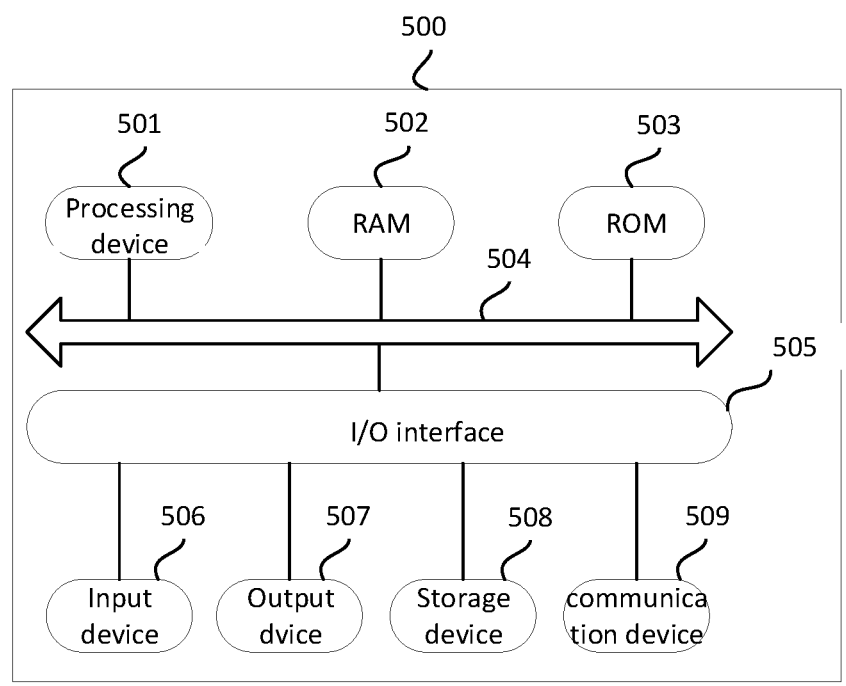
FIG. 5 is a schematic structural diagram of an electronic device provided by embodiments of the present disclosure.

Reference is made below to FIG. 5, which illustrates a schematic structural diagram of an electronic device (e.g., a terminal device) 500 suitable for realizing embodiments of the present disclosure. The terminal device 500 in embodiments of the present disclosure may include, but not limited to, mobile terminals such as a cell phone, a laptop computer, a digital broadcast receiver, a personal digital assistant (PDA), a tablet computer (PAD), a portable media player (PMP), a vehicle-mounted terminal (e.g., a vehicle navigation terminal), and the like, as well as fixed terminals such as digital televisions (TVs), desktop computers, and the like. The electronic device 500 illustrated in FIG. 5 is merely an example and should not impose any limitation on the functions and usage scopes of the embodiments of the present disclosure.

As shown in FIG. 5, the electronic device 500 may include a processing device (e.g., a central processor, a graphics processor, etc.) 501 that may perform a variety of appropriate actions and processes based on a program stored in a Read-Only Memory (ROM) 502 or loaded from a storage device 508 into a Random Access Memory (RAM) 503. Also stored in the RAM 503 are a plurality of programs and data required for operation of the electronic device 500. The processing device 501, the ROM 502, and the RAM 503 are connected to each other via a bus 504. An Input/Output (I/O) interfaces 505 is also connected to bus 504.

Typically, the following devices may be connected to the I/O interface 505: an input device 506 including, for example, a touch screen, a touch pad, a keyboard, a mouse, a camera, a microphone, an accelerometer, a gyroscope, and the like; an output device 507 including, for example, a liquid crystal display (LCD), a speaker, a vibrator, and the like; a storage device 508 including, for example, a magnetic tape, a hard disk, and the like; and a communication device 509. The communication device 509 may allow the electronic device 500 to communicate wirelessly or wiredly with other devices to exchange data. While FIG. 5 illustrates electronic device 500 with a variety of devices, it is not required to implement or have all of the illustrated devices. More or fewer devices may alternatively be implemented or possessed.

According to embodiments of the present disclosure, the processes described above with reference to the flowcharts may be implemented as a computer software program. For example, an embodiment of the present disclosure includes a computer program product including a computer program carried on a non-transitory computer-readable medium, the computer program including program codes for performing the methods shown in the flowcharts. In such embodiments, the computer program may be downloaded and installed from a network via a communication device 509, or installed from a storage device 508, or installed from a ROM 502. When the computer program is executed by the processing device 501, the above functions as defined in the method according to the embodiments of the present disclosure are performed.

The computer-readable medium as described above in the present disclosure may be a computer-readable signal medium or a computer-readable storage medium or any combination thereof. A computer-readable storage medium may be, for example,—but not limited to—a system, apparatus, or device that is electrical, magnetic, optical, electromagnetic, infrared, or semiconductor, or any combination of the above. Examples of computer-readable storage media may include, but not limited to: an electrical connection having one or more wires, a portable computer disk, a hard disk, a RAM, a ROM, an Erasable Programmable Read-Only Memory (EPROM or flash memory), a fiber optic, a portable Compact Disc Read-Only Memory (CD-ROM), optical storage devices, magnetic storage devices, or any suitable combination of the foregoing. In the context of the present disclosure, a computer-readable storage medium may be any tangible medium that contains or stores a program that may be used by or in combination with an instruction execution system, device, or apparatus. And in the context of the present disclosure, a computer-readable signal medium may include a data signal propagated in a baseband or as part of a carrier that carries computer-readable program codes. Such propagated data signals may take a variety of forms, including but not limited to electromagnetic signals, optical signals, or any suitable combination of the foregoing. The computer-readable signal medium may also be any computer-readable medium other than a computer-readable storage medium that sends, propagates, or transmits a program for use by, or in combination with, an instruction-executing system, apparatus, or device. The program codes contained on the computer-readable medium may be transmitted using any suitable medium, including, but not limited to: wire, optic cable, radio frequency (RF), etc., or any suitable combination of the foregoing.

In some implementations, the client, server may implement communication utilizing any currently known network protocol such as HyperText Transfer Protocol (HTTP) or future developed network protocol, and may be interconnected with digital data communications (e.g., communication networks) of any form or medium. Examples of communication networks include Local Area Networks (LANs), Wide Area Networks (WANs), Inter-networks (e.g., the Internet), and peer to peer Networks (e.g., ad hoc peer to peer Networks), as well as any currently known or future developed networks.

The computer-readable medium may be contained in the electronic device; or it may be separate and not assembled into such electronic device.

The computer-readable medium carries one or more programs, and when the one or more programs are executed by the electronic device, the electronic device is caused to: acquire a target local semantic point cloud map at a current position, a global semantic grid map, and a laser point cloud map, each grid of the global semantic grid map recording a value of probability that a target semantic object exists in the grid; perform pose identification on the basis of the target local semantic point cloud map and the global semantic grid map to obtain a set of candidate poses; and determine a target pose according to the laser point cloud map and the set of candidate poses, the target pose including a loop closure pose and/or a relocalization pose.

Computer program codes for performing the operations of the present disclosure may be written in one or more programming languages, or combinations thereof, including, but not limited to, object-oriented programming languages—such as Java, Smalltalk, C++, and conventional procedural programming languages—such as the "C" language or the like. The program codes may be executed entirely on the user's computer, partially on the user's computer, as a stand-alone software package, partially on the user's computer and partially on a remote computer, or entirely on a remote computer or server. In the case of a remote computer, the remote computer may be connected to the user's computer over any kind of network, including a LAN or WAN, or may be connected to an external computer (e.g., by utilizing an Internet service provider to connect over the Internet).

The flowcharts and block diagrams in the accompanying drawings illustrate architectures, functionalities, and operations that may be implemented by systems, methods, and computer program products in accordance with various embodiments of the present disclosure. In this regard, each block in the flowcharts or block diagrams may represent a module, program segment, or a portion of codes that contains one or more executable instructions for implementing a specified logical function. It should also note that in some implementations as replacements, the functions labeled in the blocks may also occur in a different order than those labeled in the accompanying drawings. For example, two consecutively represented blocks may actually be executed substantially in parallel, and they may sometimes be executed in reverse order, depending on the function involved. It should note that each of the blocks in the block diagrams and/or flowcharts, and combinations of the blocks in the block diagrams and/or flowcharts, may be implemented with a specialized hardware-based system that performs the specified functions or operations, or may be implemented with a combination of specialized hardwares and computer instructions.

Units described as being involved in embodiments of the present disclosure may be implemented by way of software or may be implemented by way of hardware. Wherein, the name of a module does not constitute a limitation on the unit itself in one case.

The functions described above herein may be performed, at least in part, by one or more hardware logic components. For example, non-limitative, exemplary types of hardware logic components that may be used include Field Programmable Gate Arrays (FPGAs), Application Specific Integrated Circuits (ASICs), Application Specific Standard Parts (ASSP), System on Chip (SOC), Complex Programmable Logic Device (CPLD), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. Examples of machine-readable storage media would include an electrical connection based on one or more wires, a portable computer disk, a hard disk, a RAM, a ROM, an EPROM or flash memory, an optical fiber, a CD-ROM, an optical storage device, a magnetic storage device, or any suitable combination of the foregoing.

According to one or more embodiments of the present disclosure, Example 1 provides a localization method, including:
  acquiring a target local semantic point cloud map at a current position, a global semantic grid map, and a laser point cloud map, wherein each grid of the global semantic grid map records a value of probability that a target semantic object exists in the grid;
  performing pose identification on the basis of the target local semantic point cloud map and the global semantic grid map to obtain a set of candidate poses; and
  determining a target pose according to the laser point cloud map and the set of candidate poses, wherein the target pose includes a loop closure pose and/or a relocalization pose.

According to one or more embodiments of the present disclosure, Example 2 the method according to Example 1, the acquiring a target local semantic point cloud map at a current position, a global semantic grid map, and a laser point cloud map, includes:
  acquiring a target local semantic point cloud map at the current position, global semantic grid maps at at least two levels, and a laser point cloud map, wherein the global semantic grid maps at different levels have different resolutions.

According to one or more embodiments of the present disclosure, Example 3 the method according to Example 2, the performing pose identification on the basis of the target local semantic point cloud map and the global semantic grid map to obtain a set of candidate poses, includes:
  acquiring a target grid stack including grids with a probability value of greater than zero in the global semantic grid map at the highest level, wherein the level of each global semantic grid map is negatively correlated with the resolution;
  calculating, based on the target local semantic point cloud map, a first evaluation index for each grid in the target grid stack and a first evaluation index value for at least one grid in another level of global semantic grid map, and determining, based on the first evaluation index value, a candidate pose to obtain a set of candidate poses.

According to one or more embodiments of the present disclosure, Example 4 the method according to Example 3, the calculating, based on the target local semantic point cloud map, a first evaluation index for each grid in the target grid stack and a first evaluation index value for at least one grid in another level of global semantic grid map, and determining, based on the first evaluation index value, a candidate pose to obtain a set of candidate poses, includes:
  constructing a current map identical to the target local semantic point cloud map;
  creating a current grid stack identical to the target grid stack, and controlling a current grid located at the top of the current grid stack to pop;
  calculating a first evaluation index value for the current grid based on the current map;
  if the first evaluation index value is greater than a first index threshold, judging whether the target global semantic grid map in which the current grid is located is a semantic grid map at the lowest level or not, and if the target global semantic grid map in which the current grid is located is the semantic grid map at the lowest level, adding a target angle and corresponding position coordinates of the current grid in the global semantic point cloud map into the set of candidate poses as a candidate pose, and if the target global semantic grid map in which the current grid is located is not the semantic grid map at the lowest level, adding a corresponding grid of the current grid in the grid map at the next level into the current grid stack; returning to perform the operation of controlling the current grid located at the top of the current grid stack to pop, until the current grid stack is empty; wherein the target angle is an angle of rotation of the current map in relation to the target local semantic point cloud map; and if the first evaluation index value is less than or equal to the first index threshold, returning to perform an operation of controlling the current grid located at the top of the current grid stack to pop, until the current grid stack is empty.

According to one or more embodiments of the present disclosure, Example 5 the method according to Example 4, further includes:

when the current grid stack is empty, rotating the current map by a preset rotation angle, obtaining a rotated local semantic point cloud map as the current map, and returning to perform the operation of creating a current grid stack identical to the target grid stack, until the current map is rotated by one circle.

According to one or more embodiments of the present disclosure, Example 6 the method according to Example 4, the calculating a first evaluation index value for the current grid based on the current map, includes:

translating the current map to move a corresponding coordinate point of the current grid in the current map to an origin position, to obtain a translated map;

acquiring a probability value that is recorded in a grid in the target global semantic grid map corresponding to each semantic feature point within the translated map, as a probability value of the semantic feature point; and calculating the first evaluation index value for the current grid based on the probability value of each semantic feature point.

According to one or more embodiments of the present disclosure, Example 7 the method according to Example 6, the calculating the first evaluation index value for the current grid based on the probability value of each semantic feature point, includes:

when the target global semantic grid map is not a semantic grid map at the lowest level, calculating a probability average for a plurality of semantic feature points based on the probability value of each semantic feature point, as the first evaluation index value for the current grid; and when the target global semantic grid map is the semantic grid map at the lowest level, calculating a probability average of the plurality of semantic feature points and a penalty function average based on the probability value of each semantic feature point, and taking the difference between the probability average and the penalty function average as the first evaluation index value for the current grid, wherein the penalty function average is used to characterize the degree of mismatch between the current map and the target global semantic grid map.

According to one or more embodiments of the present disclosure, Example 8 the method according to any one of Examples 3-7, the determining a target pose according to the laser point cloud map and the set of candidate poses, includes:

based on a corresponding first evaluation index for each candidate pose in the set of candidate poses, calculating a weighted average of each pose parameter of a plurality of candidate poses as an average pose parameter;

determining a search space by taking the average pose parameter as a center and discretizing the search space to obtain a plurality of to-be-searched poses;

employing an iterative nearest-point algorithm to determine information about matching between each to-be-searched pose and the laser point cloud map, and calculating a second evaluation index value for each to-be-searched pose based on the matching information; and selecting a to-be-searched pose with the largest second evaluation index value as a target pose.

According to one or more embodiments of the present disclosure, Example 9 the method according to Example 8, before selecting a to-be-searched pose with the largest second evaluation index value as a target pose, further includes:

determining that a standard deviation of target pose parameters of the to-be-searched poses for which the second evaluation index value is greater than a second index threshold is less than a corresponding preset standard deviation threshold.

According to one or more embodiments of the present disclosure, Example 10 the method according to any one of Examples 2-7, before the acquiring a target local semantic point cloud map at the current position, global semantic grid maps at at least two levels, and a laser point cloud map, further includes generating the global semantic grid maps at at least two levels based on a global semantic point cloud map.

According to one or more embodiments of the present disclosure, Example 11 the method according to Example 10, the generating the global semantic grid maps at at least two levels based on a global semantic point cloud map, includes:

performing grid division on the global semantic point cloud map according to a preset size, and determining a probability of existence of a target semantic object in each grid to obtain a global semantic grid map at the lowest level;

down-sampling the global semantic grid map at the lowest level at least once, and the global semantic grid map obtained by down-sampling each time serves as the global semantic grid map at the corresponding level.

According to one or more embodiments of the present disclosure, Example 12 the method according to any one of Examples 1-7, after the determining a target pose according to the laser point cloud map and the set of candidate poses, further includes:

continuing to move and, after continuing to move a preset distance, verifying the target pose using a local semantic point cloud map within the predetermined distance in order to perform relocalization in case the verification fails.

According to one or more embodiments of the present disclosure, Example 13 the method according to any one of Examples 1-7, before the acquiring a target local semantic point cloud map at a current position, the global semantic grid maps at at least two levels, and a laser point cloud map, further includes:

acquiring a first feature point of each foreground semantic object and a second feature point of each background semantic object in an original local semantic point cloud map at the current location; and downsampling the first feature points and the second feature points by using different manners of downsampling, and constructing the target local semantic point cloud map based on downsampled feature points.

According to one or more embodiments of the present disclosure, Example 14 the method according to Example 13, the downsampling the first feature points and the second feature points by using different manners of downsampling, and constructing the target local semantic point cloud map based on downsampled feature points, includes:

performing Euclidean distance clustering on a plurality of the first feature points and taking each cluster center after clustering as a first downsampled feature point;

performing voxelized downsampling on the plurality of second feature points to obtain second downsampled feature points; and constructing the target local semantic point cloud map based on the first downsampled feature point and the second downsampled feature point.

According to one or more embodiments of the present disclosure, Example 15 the method according to any one of Examples 1-7, the method is applicable to localize a robot.

According to one or more embodiments of the present disclosure, Example 16 provides a localization apparatus including:

a map acquisition module configured to acquire a target local semantic point cloud map at a current position, a global semantic grid map, and a laser point cloud map, wherein each grid of the global semantic grid map recording a value of probability that a target semantic object exists in the grid;

a candidate pose identification module configured to perform pose identification on the basis of the target local semantic point cloud map and the global semantic grid map to obtain a set of candidate poses; and a target pose determination module configured to determine a target pose according to the laser point cloud map and the set of candidate poses, wherein the target pose includes a loop closure pose and/or a relocalization pose.

According to one or more embodiments of the present disclosure, Example 17 provides an electronic device including:

one or more processors;

a memory, configured to store one or more programs;

the one or more programs, when executed by the one or more processors, cause the one or more processors implement a localization method according to any of Examples 1-15.

According to one or more embodiments of the present disclosure, Example 18 provides a computer-readable storage medium having stored thereon a computer program that, when executed by a processor, implements a localization method according to any one of Examples 1-15.

Furthermore, while a plurality of operations are depicted using a particular order, this should not be construed as requiring that the operations be performed in the particular order shown or in a sequential order of execution. Multitasking and parallel processing may be advantageous in certain environments. Similarly, while multiple implementation details are included in the above discussion, these should not be construed as limiting the scope of the present disclosure. Some of the features described in the context of separate embodiments may also be implemented in combination in a single embodiment. Conversely, a plurality of features described in the context of a single embodiment may also be implemented in multiple embodiments, either individually or in any suitable sub-combination.

What is claimed is:

1. A localization method, comprising:

acquiring a target local semantic point cloud map at a current position, global semantic grid maps at two or more levels, and a laser point cloud map, wherein the global semantic grid maps at different levels have different resolutions, wherein each grid of the global semantic grid map records a value of probability that a target semantic object exists in the grid;

performing pose identification on the basis of the target local semantic point cloud map and the global semantic grid map to obtain a set of candidate poses; and determining a target pose according to the laser point cloud map and the set of candidate poses, wherein the target pose comprises a loop closure pose and/or a relocalization pose, wherein, the performing pose identification on the basis of the target local semantic point cloud map and the global semantic grid map to obtain a set of candidate poses, comprises:

acquiring a target grid stack comprising grids with a probability value of greater than zero in the global semantic grid map at the highest level, wherein the level of each global semantic grid map is negatively correlated with the resolution;

calculating, based on the target local semantic point cloud map, a first evaluation index for each grid in the target grid stack and a first evaluation index value for at least one grid in another level of global semantic grid map, and determining, based on the first evaluation index value, a candidate pose to obtain a set of candidate poses, wherein, the calculating, based on the target local semantic point cloud map, a first evaluation index for each grid in the target grid stack and a first evaluation index value for at least one grid in another level of global semantic grid map, and determining, based on the first evaluation index value, a candidate pose to obtain a set of candidate poses, comprises:

constructing a current map identical to the target local semantic point cloud map;

creating a current grid stack identical to the target grid stack, and controlling a current grid located at the top of the current grid stack to pop;

calculating a first evaluation index value for the current grid based on the current map; and determining the candidate pose based on the grid for which the first evaluation index value is greater than a first index threshold.

2. The method of claim 1, wherein, the determining the candidate pose based on the grid for which the first evaluation index value is greater than a first index threshold, comprises:

if the first evaluation index value is greater than a first index threshold, judging whether the target global semantic grid map in which the current grid is located is a semantic grid map at the lowest level or not, and if the target global semantic grid map in which the current grid is located is the semantic grid map at the lowest level, adding a target angle and corresponding position coordinates of the current grid in the global semantic point cloud map into the set of candidate poses as a candidate pose, and if the target global semantic grid map in which the current grid is located is not the semantic grid map at the lowest level, adding a corresponding grid of the current grid in the grid map at the next level into the current grid stack; returning to perform the operation of controlling the current grid located at the top of the current grid stack to pop, until the current grid stack is empty; wherein the target angle is an angle of rotation of the current map in relation to the target local semantic point cloud map; and if the first evaluation index value is less than or equal to the first index threshold, returning to perform an operation of controlling the current grid located at the top of the current grid stack to pop, until the current grid stack is empty.

3. The method of claim 2, further comprising:

when the current grid stack is empty, rotating the current map by a preset rotation angle, obtaining a rotated local semantic point cloud map as the current map, and returning to perform the operation of creating a current grid stack identical to the target grid stack, until the current map is rotated by one circle.

4. The method of claim 1, wherein, the calculating a first evaluation index value for the current grid based on the current map, comprises:

translating the current map to move a corresponding coordinate point of the current grid in the current map to an origin position, to obtain a translated map;

acquiring a probability value that is recorded in a grid in the target global semantic grid map corresponding to each semantic feature point within the translated map, as a probability value of the semantic feature point; and calculating the first evaluation index value for the current grid based on the probability value of each semantic feature point.

5. The method of claim 4, wherein, the calculating the first evaluation index value for the current grid based on the probability value of each semantic feature point, comprises:

when the target global semantic grid map is not a semantic grid map at the lowest level, calculating a probability average for a plurality of semantic feature points based on the probability value of each semantic feature point, as the first evaluation index value for the current grid; and when the target global semantic grid map is the semantic grid map at the lowest level, calculating a probability average of the plurality of semantic feature points and a penalty function average based on the probability value of each semantic feature point, and taking the difference between the probability average and the penalty function average as the first evaluation index value for the current grid, wherein the penalty function average is used to characterize the degree of mismatch between the current map and the target global semantic grid map.

6. The method of claim 1, wherein, the determining a target pose according to the laser point cloud map and the set of candidate poses, comprises:

based on a corresponding first evaluation index for each candidate pose in the set of candidate poses, calculating a weighted average of each pose parameter of a plurality of candidate poses as an average pose parameter, determining a search space by taking the average pose parameter as a center and discretizing the search space to obtain a plurality of to-be-searched poses;

employing an iterative nearest-point algorithm to determine information about matching between each to-be-searched pose and the laser point cloud map, and calculating a second evaluation index value for each to-be-searched pose based on the matching information; and selecting a to-be-searched pose with the largest second evaluation index value as a target pose.

7. The method of claim 6, before selecting a to-be-searched pose with the largest second evaluation index value as a target pose, further comprising:

determining that a standard deviation of target pose parameters of the to-be-searched poses for which the second evaluation index value is greater than a second index threshold is less than a corresponding preset standard deviation threshold.

8. The method according to claim 1, before the acquiring a target local semantic point cloud map at the current position, global semantic grid maps at two or more levels, and a laser point cloud map, further comprising generating the global semantic grid maps at two or more levels based on a global semantic point cloud map.

9. The method of claim 8, wherein, the generating the global semantic grid maps at two or more levels based on a global semantic point cloud map, comprises:

performing grid division on the global semantic point cloud map according to a preset size, and determining a probability of existence of a target semantic object in each grid to obtain a global semantic grid map at the lowest level;

down-sampling the global semantic grid map at the lowest level at least once, and the global semantic grid map obtained by down-sampling each time serves as the global semantic grid map at the corresponding level.

10. The method of claim 1, after the determining a target pose according to the laser point cloud map and the set of candidate poses, further comprising:

continuing to move and, after continuing to move a preset distance, verifying the target pose using a local semantic point cloud map within the predetermined distance in order to perform relocalization in case the verification fails.

11. The method of claim 1, before the acquiring a target local semantic point cloud map at a current position, the global semantic grid maps at two or more levels, and a laser point cloud map, further comprising:

acquiring a first feature point of each foreground semantic object and a second feature point of each background semantic object in an original local semantic point cloud map at the current location; and downsampling the first feature points and the second feature points by using different manners of downsampling, and constructing the target local semantic point cloud map based on downsampled feature points.

12. The method of claim 11, wherein, the downsampling the first feature points and the second feature points by using different manners of downsampling, and constructing the target local semantic point cloud map based on downsampled feature points, comprises:

performing Euclidean distance clustering on a plurality of the first feature points and taking each cluster center after clustering as a first downsampled feature point;

performing voxelized downsampling on the plurality of second feature points to obtain second downsampled feature points; and constructing the target local semantic point cloud map based on the first downsampled feature point and the second downsampled feature point.

13. A non-transitory computer-readable storage medium having stored thereon a computer program that, when executed by a processor, implements:

acquiring a target local semantic point cloud map at a current position, global semantic grid maps at two or more levels, and a laser point cloud map, wherein the global semantic grid maps at different levels have different resolutions, wherein each grid of the global semantic grid map records a value of probability that a target semantic object exists in the grid;

performing pose identification on the basis of the target local semantic point cloud map and the global semantic grid map to obtain a set of candidate poses; and determining a target pose according to the laser point cloud map and the set of candidate poses, wherein the target pose comprises a loop closure pose and/or a relocalization pose, wherein, the performing pose identification on the basis of the target local semantic point cloud map and the global semantic grid map to obtain a set of candidate poses, comprises:

acquiring a target grid stack comprising grids with a probability value of greater than zero in the global semantic grid map at the highest level, wherein the level of each global semantic grid map is negatively correlated with the resolution;

calculating, based on the target local semantic point cloud map, a first evaluation index for each grid in the target grid stack and a first evaluation index value for at least one grid in another level of global semantic grid map, and determining, based on the first evaluation index value, a candidate pose to obtain a set of candidate poses, wherein, the calculating, based on the target local semantic point cloud map, a first evaluation index for each grid in the target grid stack and a first evaluation index value for at least one grid in another level of global semantic grid map, and determining, based on the first evaluation index value, a candidate pose to obtain a set of candidate poses, comprises:

constructing a current map identical to the target local semantic point cloud map;

creating a current grid stack identical to the target grid stack, and controlling a current grid located at the top of the current grid stack to pop;

calculating a first evaluation index value for the current grid based on the current map; and determining the candidate pose based on the grid for which the first evaluation index value is greater than a first index threshold.

14. The non-transitory computer-readable storage medium of claim 13, wherein the computer program that, when executed by a processor, further implements: after the determining a target pose according to the laser point cloud map and the set of candidate poses:

continuing to move and, after continuing to move a preset distance, verifying the target pose using a local semantic point cloud map within the predetermined distance in order to perform relocalization in case the verification fails.

15. The non-transitory computer-readable storage medium of claim 13, wherein the computer program that, when executed by a processor, further implements: before the acquiring a target local semantic point cloud map at a current position, the global semantic grid maps at two or more levels, and a laser point cloud map, acquiring a first feature point of each foreground semantic object and a second feature point of each background semantic object in an original local semantic point cloud map at the current location; and downsampling the first feature points and the second feature points by using different manners of downsampling, and constructing the target local semantic point cloud map based on downsampled feature points.

16. An electronic device comprising:
one or more processors;
a memory, configured to store one or more programs;
the one or more programs, when executed by the one or more processors, cause the one or more processors implement:

acquiring a target local semantic point cloud map at a current position, global semantic grid maps at two or more levels, and a laser point cloud map, wherein the global semantic grid maps at different levels have different resolutions, wherein each grid of the global semantic grid map records a value of probability that a target semantic object exists in the grid;

performing pose identification on the basis of the target local semantic point cloud map and the global semantic grid map to obtain a set of candidate poses; and determining a target pose according to the laser point cloud map and the set of candidate poses, wherein the target pose comprises a loop closure pose and/or a relocalization pose, wherein, the performing pose identification on the basis of the target local semantic point cloud map and the global semantic grid map to obtain a set of candidate poses, comprises:

acquiring a target grid stack comprising grids with a probability value of greater than zero in the global semantic grid map at the highest level, wherein the level of each global semantic grid map is negatively correlated with the resolution;

calculating, based on the target local semantic point cloud map, a first evaluation index for each grid in the target grid stack and a first evaluation index value for at least one grid in another level of global semantic grid map, and determining, based on the first evaluation index value, a candidate pose to obtain a set of candidate poses, wherein, the calculating, based on the target local semantic point cloud map, a first evaluation index for each grid in the target grid stack and a first evaluation index value for at least one grid in another level of global semantic grid map, and determining, based on the first evaluation index value, a candidate pose to obtain a set of candidate poses, comprises:

constructing a current map identical to the target local semantic point cloud map;

creating a current grid stack identical to the target grid stack, and controlling a current grid located at the top of the current grid stack to pop;

calculating a first evaluation index value for the current grid based on the current map; and determining the candidate pose based on the grid for which the first evaluation index value is greater than a first index threshold.

17. The electronic device of claim 16, wherein the one or more programs, when executed by the one or more processors, cause the one or more processors to further implement: after the determining a target pose according to the laser point cloud map and the set of candidate poses:

continuing to move and, after continuing to move a preset distance, verifying the target pose using a local semantic point cloud map within the predetermined distance in order to perform relocalization in case the verification fails.

18. The electronic device of claim 16, wherein the one or more programs, when executed by the one or more processors, cause the one or more processors to further implement:
before the acquiring a target local semantic point cloud map at a current position, the global semantic grid maps at two or more levels, and a laser point cloud map,
- acquiring a first feature point of each foreground semantic object and a second feature point of each background semantic object in an original local semantic point cloud map at the current location; and
- downsampling the first feature points and the second feature points by using different manners of downsampling, and constructing the target local semantic point cloud map based on downsampled feature points.

\* \* \* \* \*